United States Patent [19]

Froyd et al.

[11] 4,149,235
[45] Apr. 10, 1979

[54] COMPUTER NUMERICAL CONTROL SYSTEM FOR MACHINE TOOL

[75] Inventors: Stanley G. Froyd, San Marino; William A. Frank, San Gabriel; Richard Roome, Claremont, all of Calif.

[73] Assignee: McDonnell Douglas Corporation, Long Beach, Calif.

[21] Appl. No.: 754,438

[22] Filed: Dec. 27, 1976

[51] Int. Cl.² .................................................. G06F 15/46
[52] U.S. Cl. ........................................... 364/101; 235/307; 364/107; 364/578; 364/900
[58] Field of Search ................... 307/247 A, 204, 211, 307/231; 340/365 E; 364/900, 107, 101, 578; 235/307; 328/92, 95

[56] References Cited

U.S. PATENT DOCUMENTS

| | | | |
|---|---|---|---|
| 3,810,104 | 5/1974 | Markley | 445/1 |
| 4,038,533 | 8/1977 | Dummermuth | 235/151.11 |
| 4,044,312 | 8/1977 | D'Ortenzio | 307/247 A |
| 4,058,711 | 11/1977 | Ondercin et al. | 364/101 |

OTHER PUBLICATIONS

"Specifications System 7360" by Allen-Bradley Co., Pub. 7360-500, Jun. 1976, pp. 1, 2, 3, 4, 5, 16.

*Primary Examiner*—Felix D. Gruber
*Attorney, Agent, or Firm*—Henry G. Kohlmann; Walter J. Jason; Donald L. Royer

[57] ABSTRACT

A numerical control system for a machine tool. The relay controls for the machine tool are simulated in the read only memory of a computer which is used as a controller for the flow of digital information between the control display panel, the tape reader, a memory, the machine tool and other parts of the system. Since the simulation is based on relay diagrams, the user can customize the control system to his requirements without having been previously trained in computer programming or computer systems. Also, since the control system is adapted to the machine tool by software changes, the same hardware is usable without modification by a variety of machine tools, such as turret lathes and milling machines, and under a variety of operation conditions. Data debouncing and diagnostic aids are included in the system.

8 Claims, 33 Drawing Figures

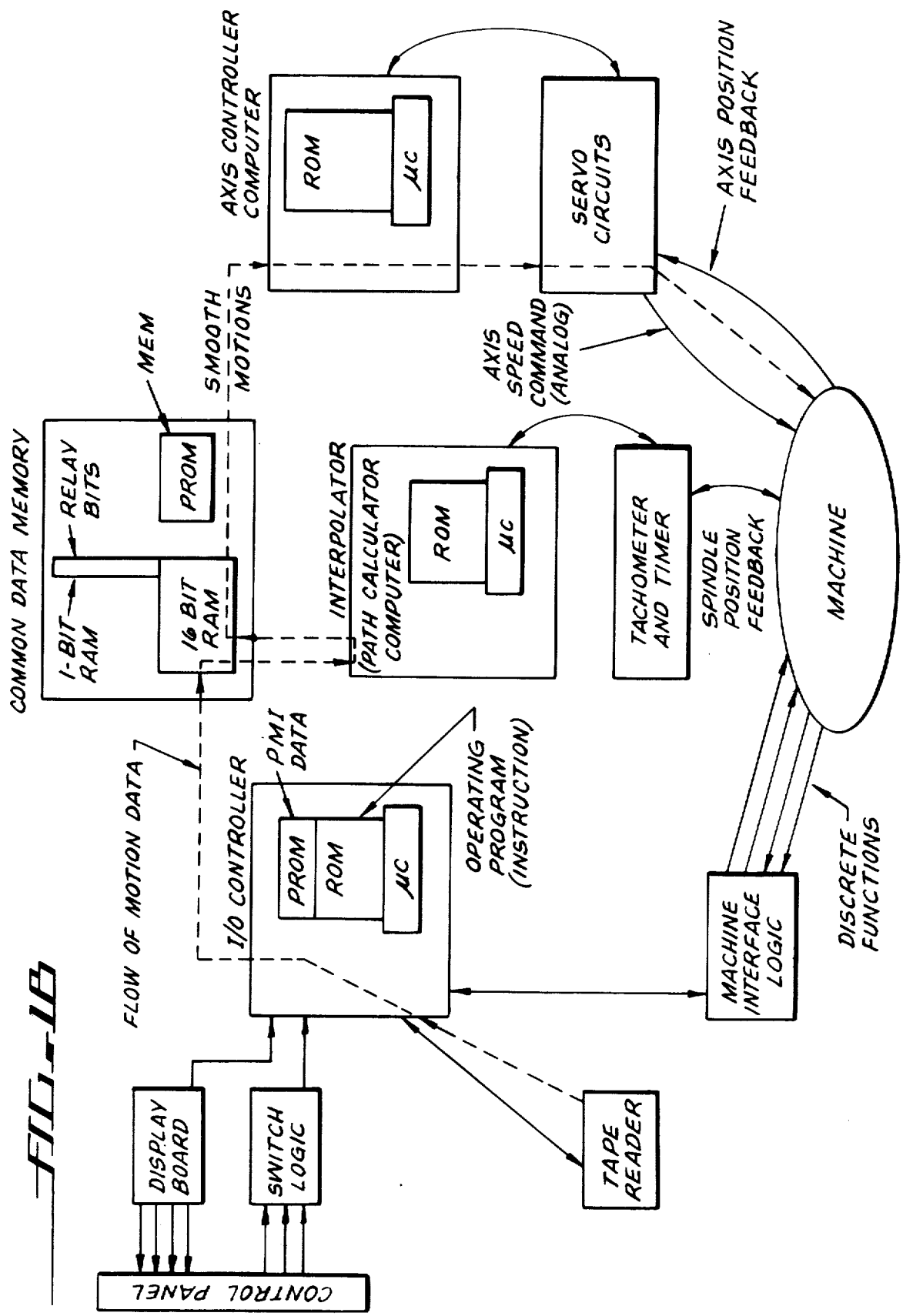

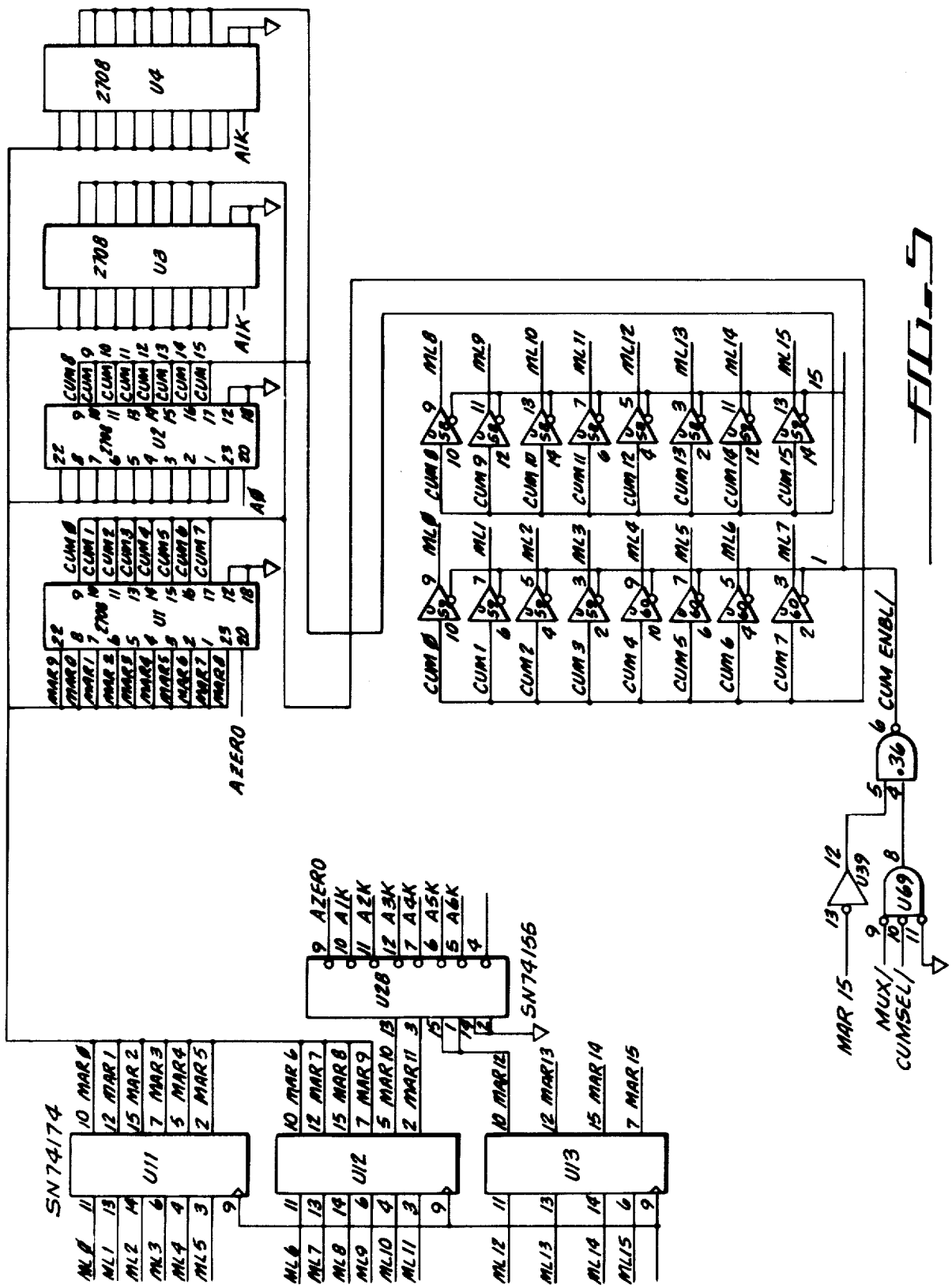

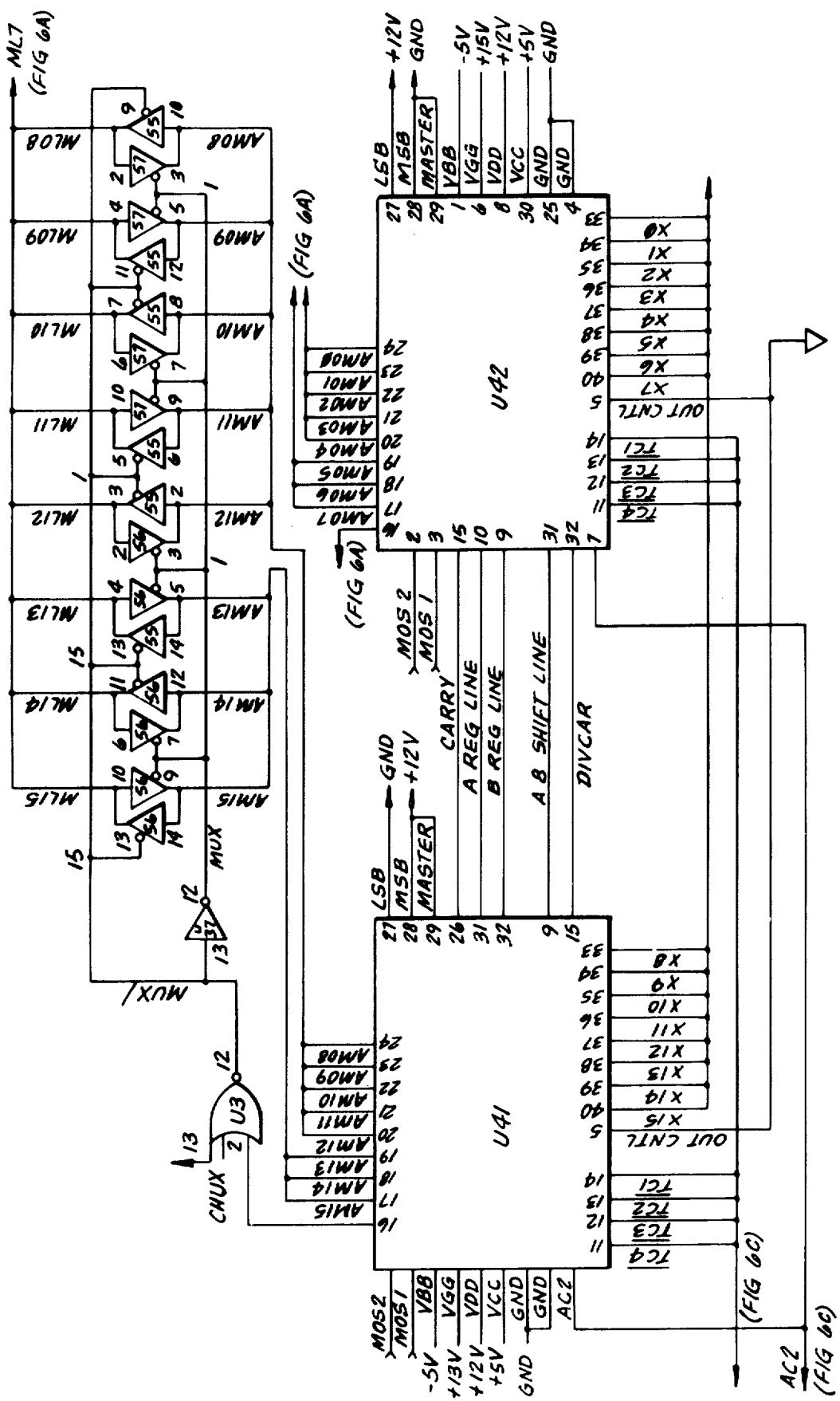

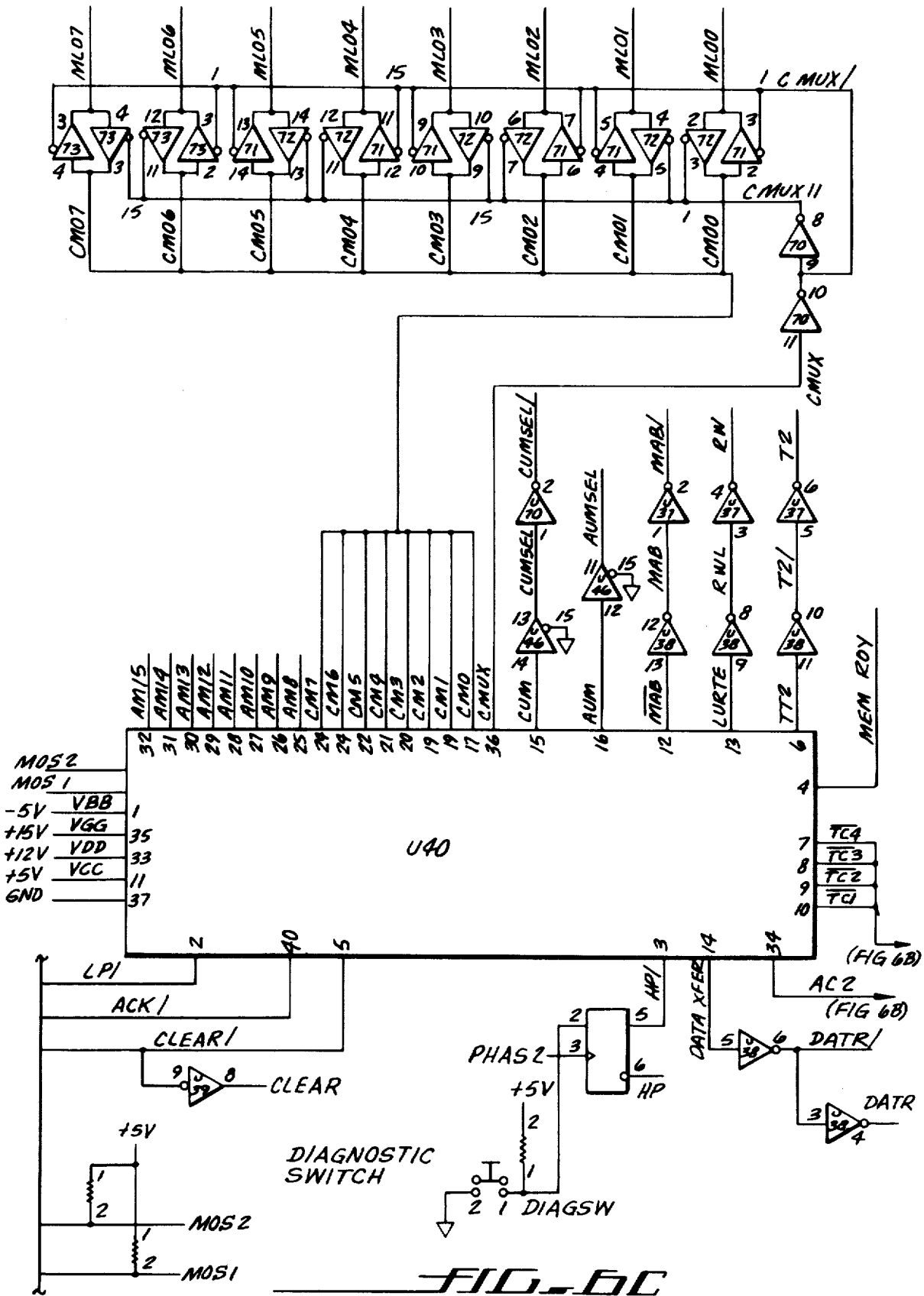
FIG_6C

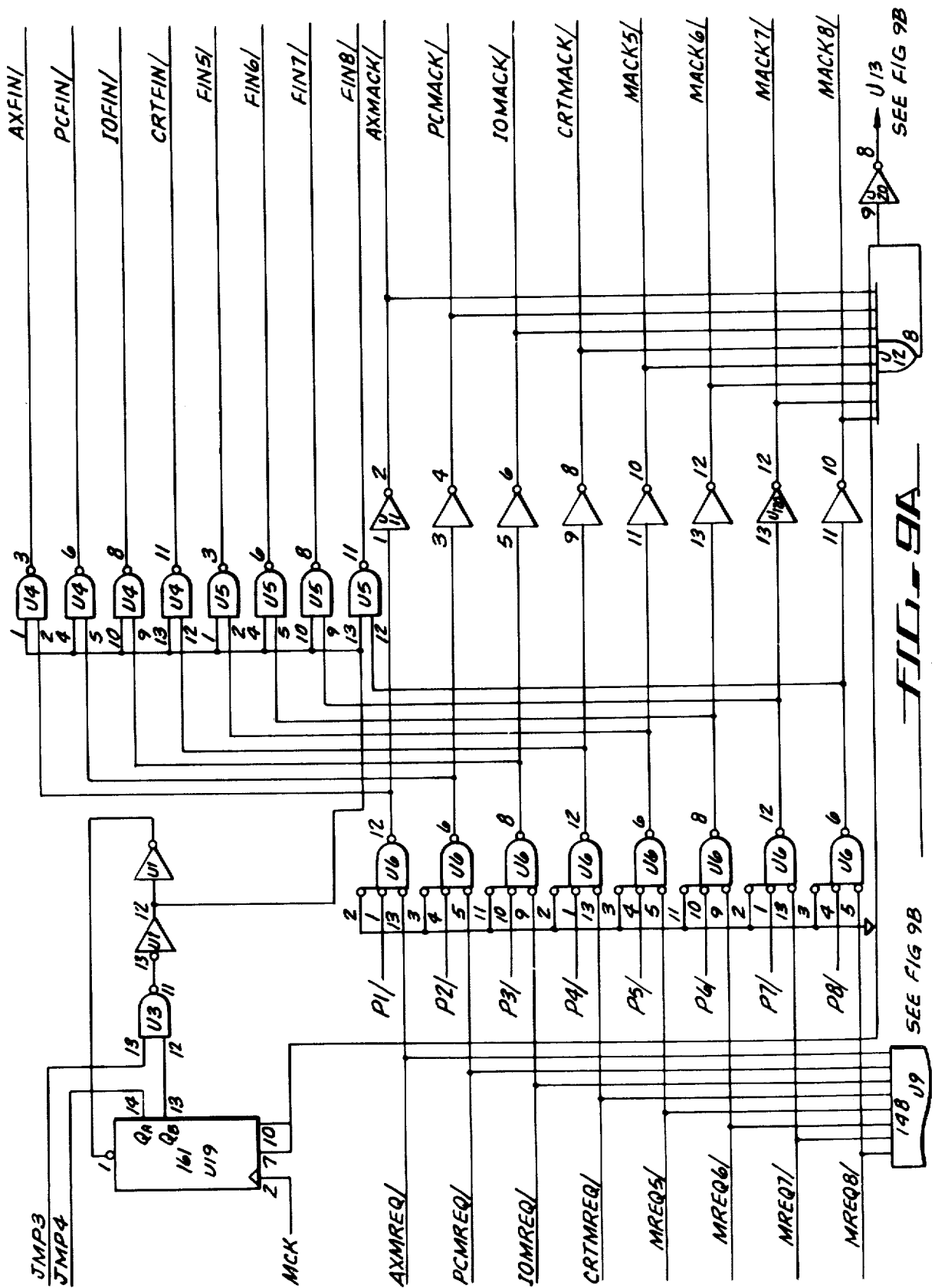

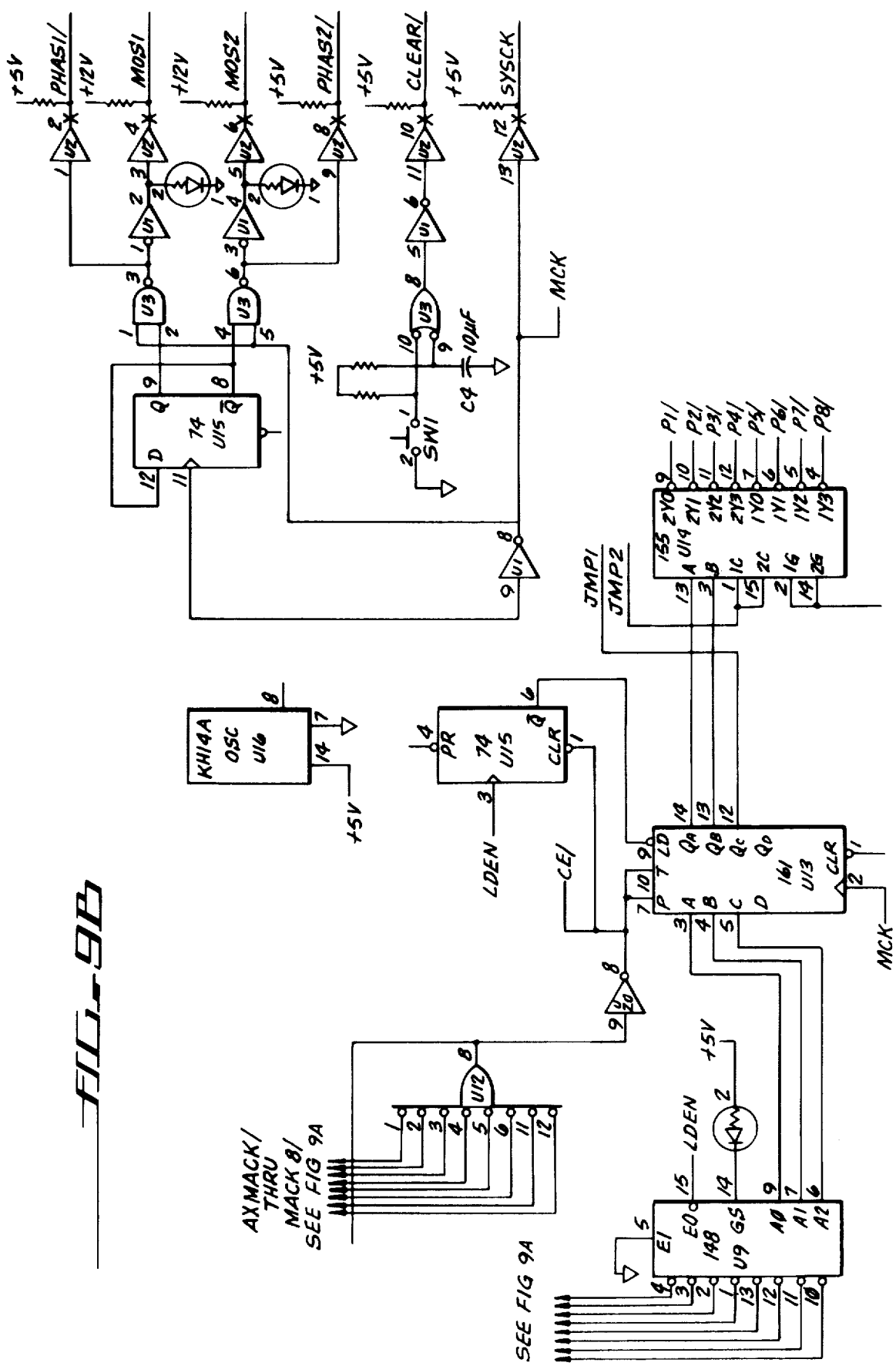

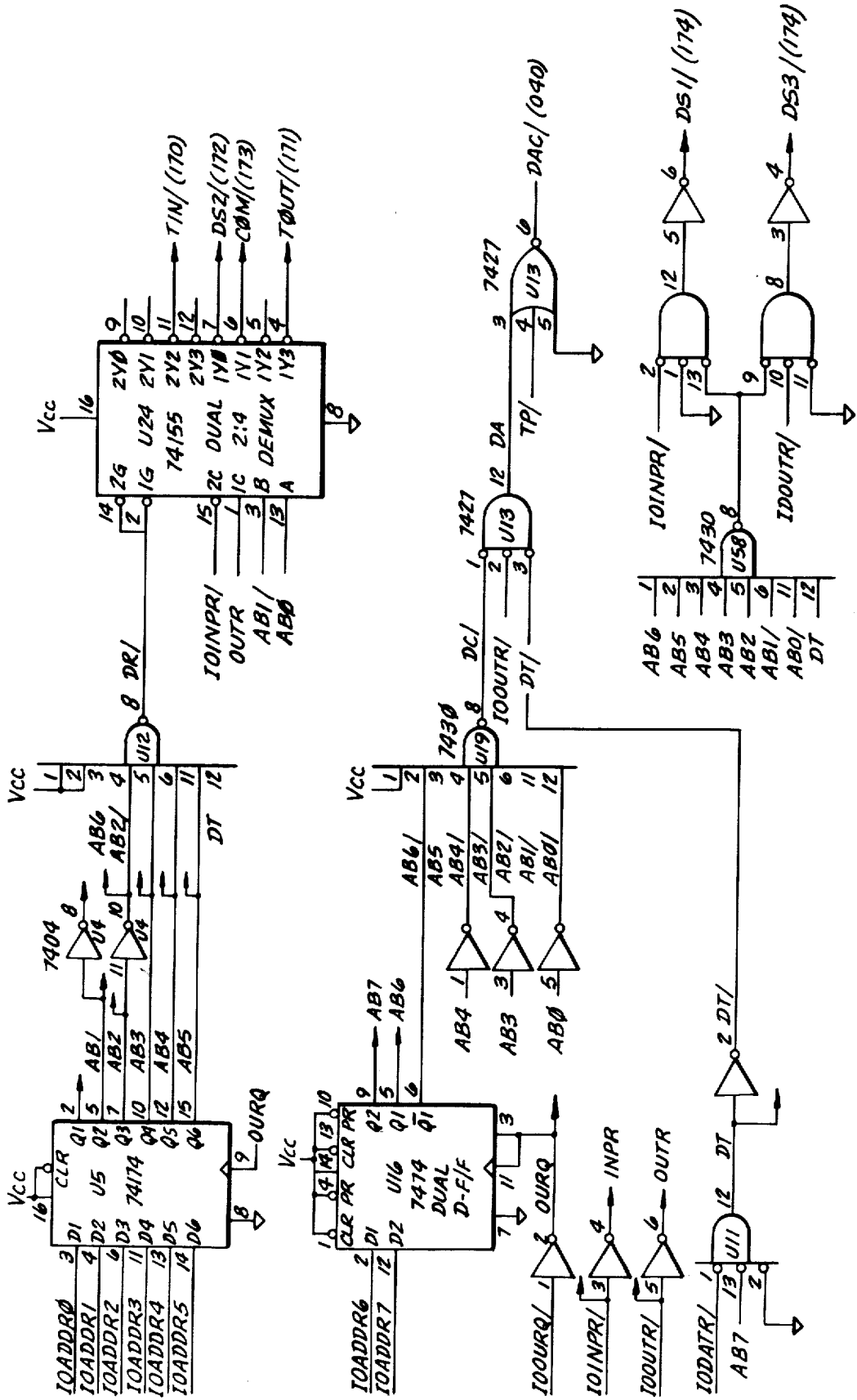

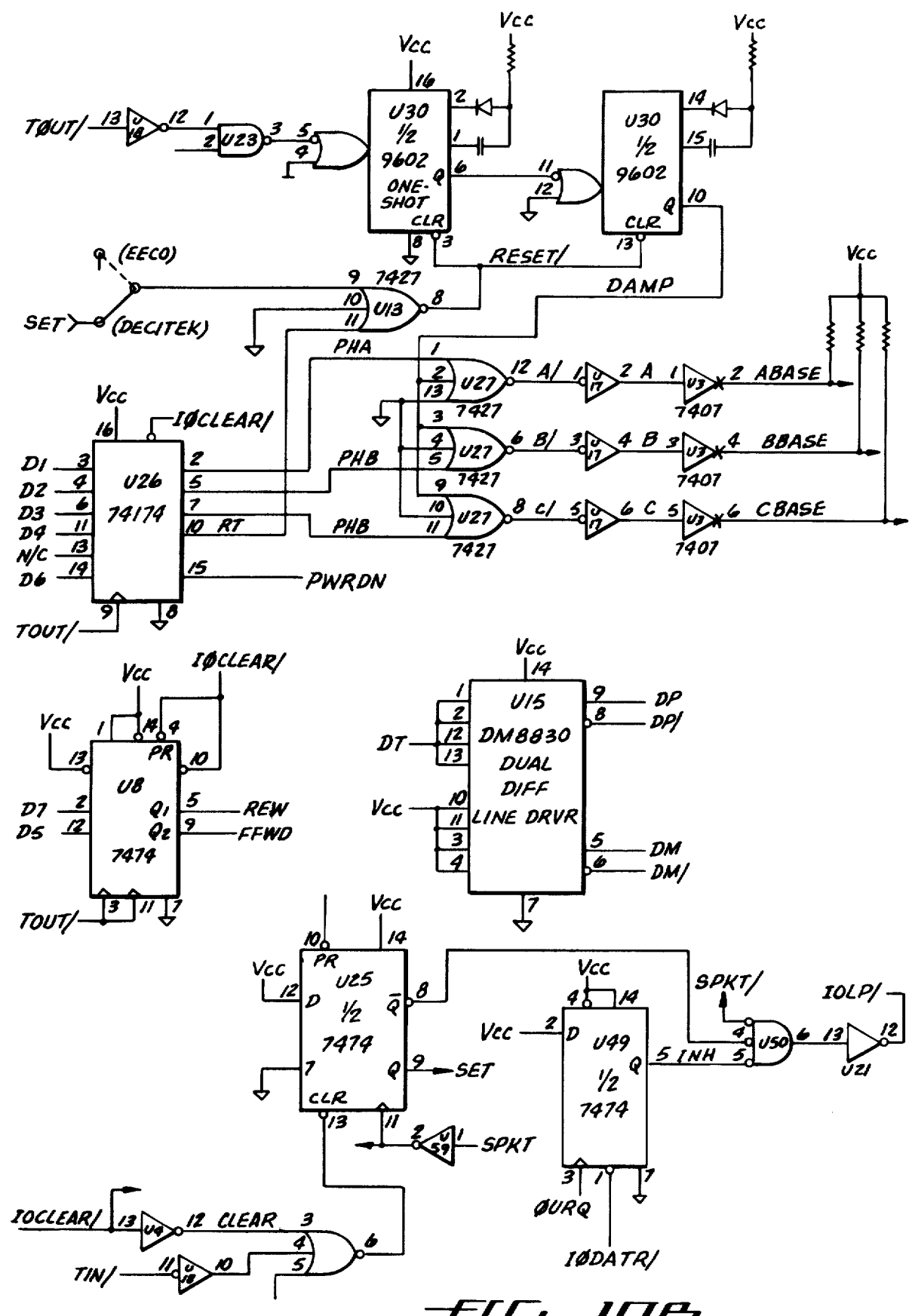

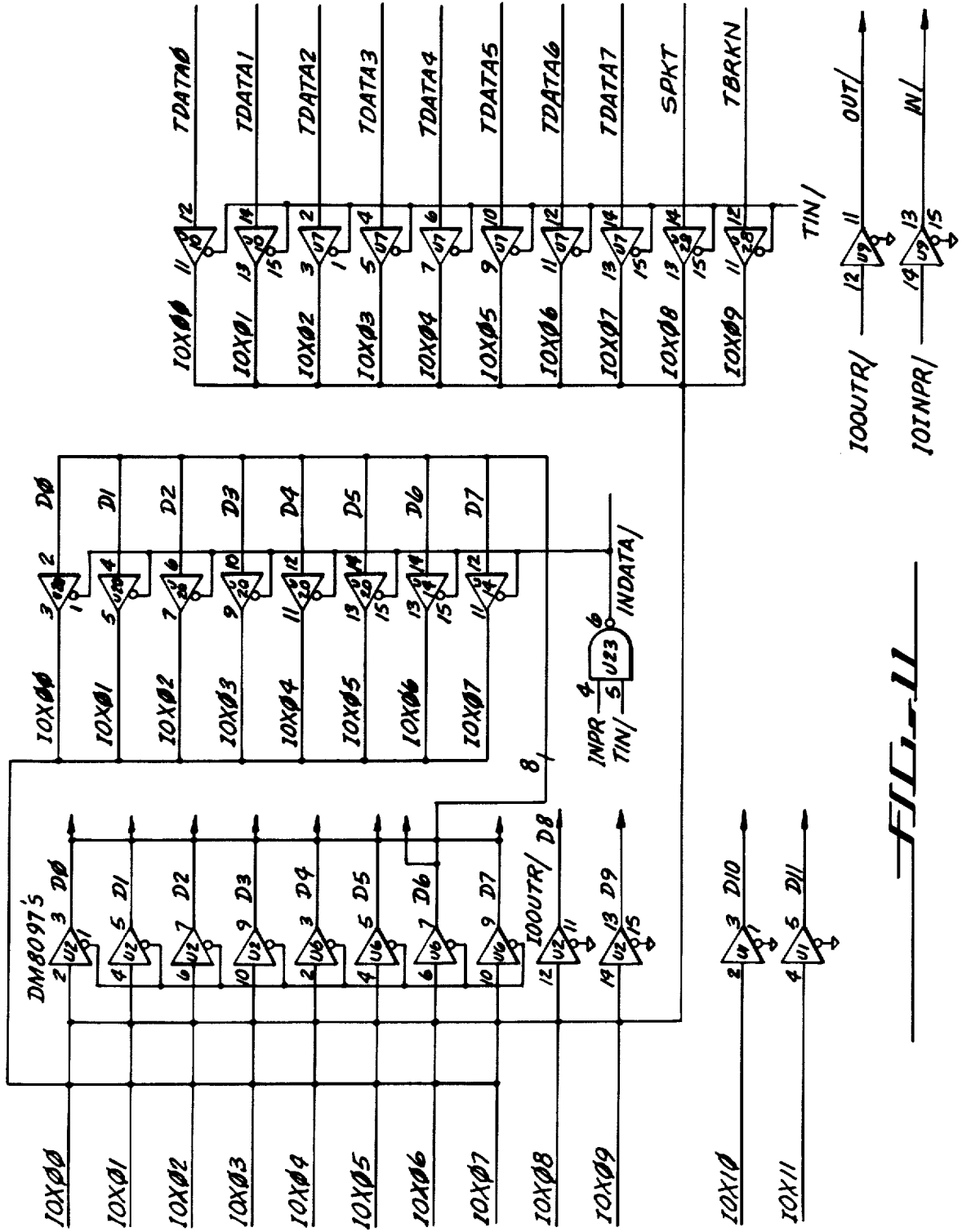
FIG_11

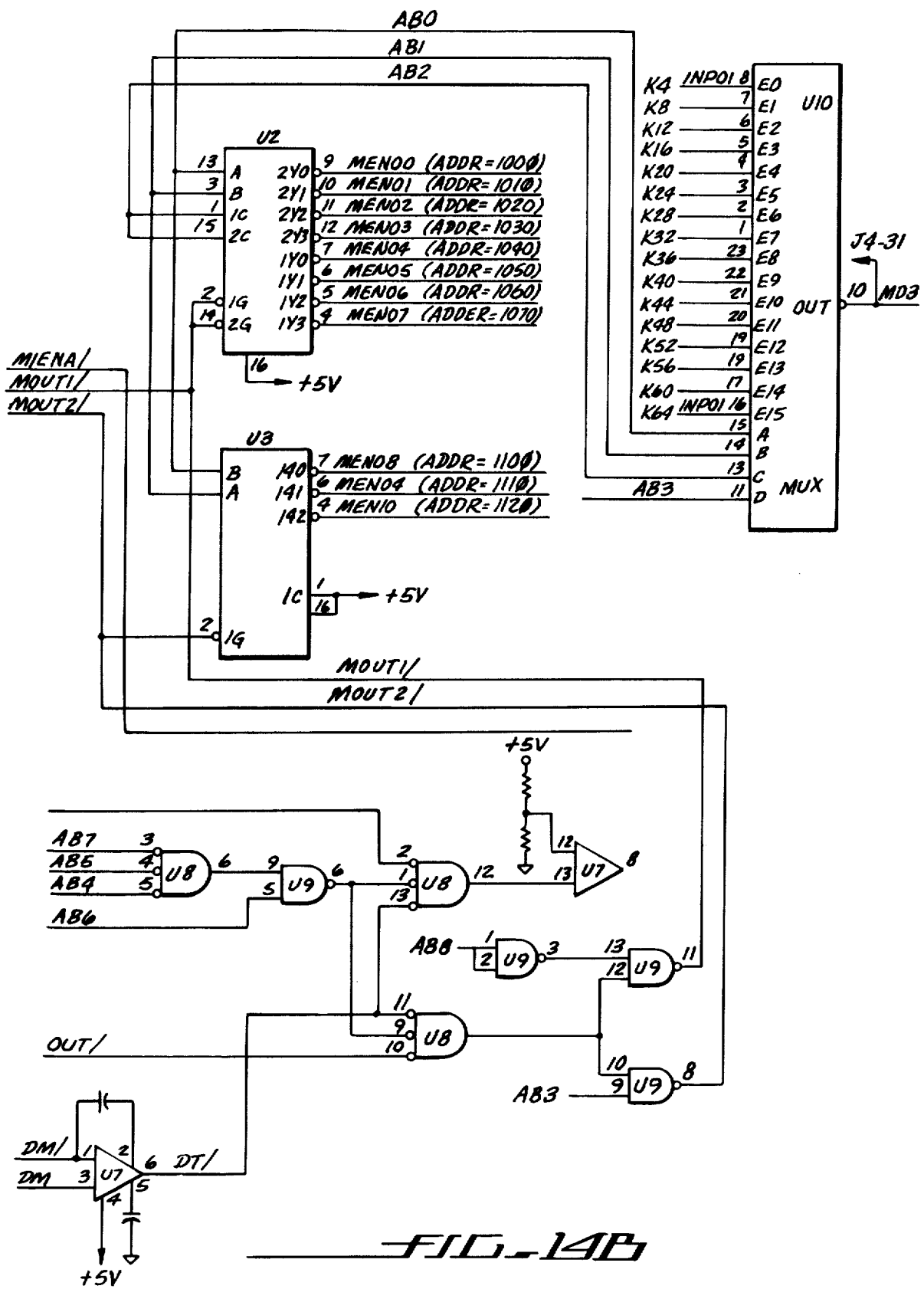
FIG_14B

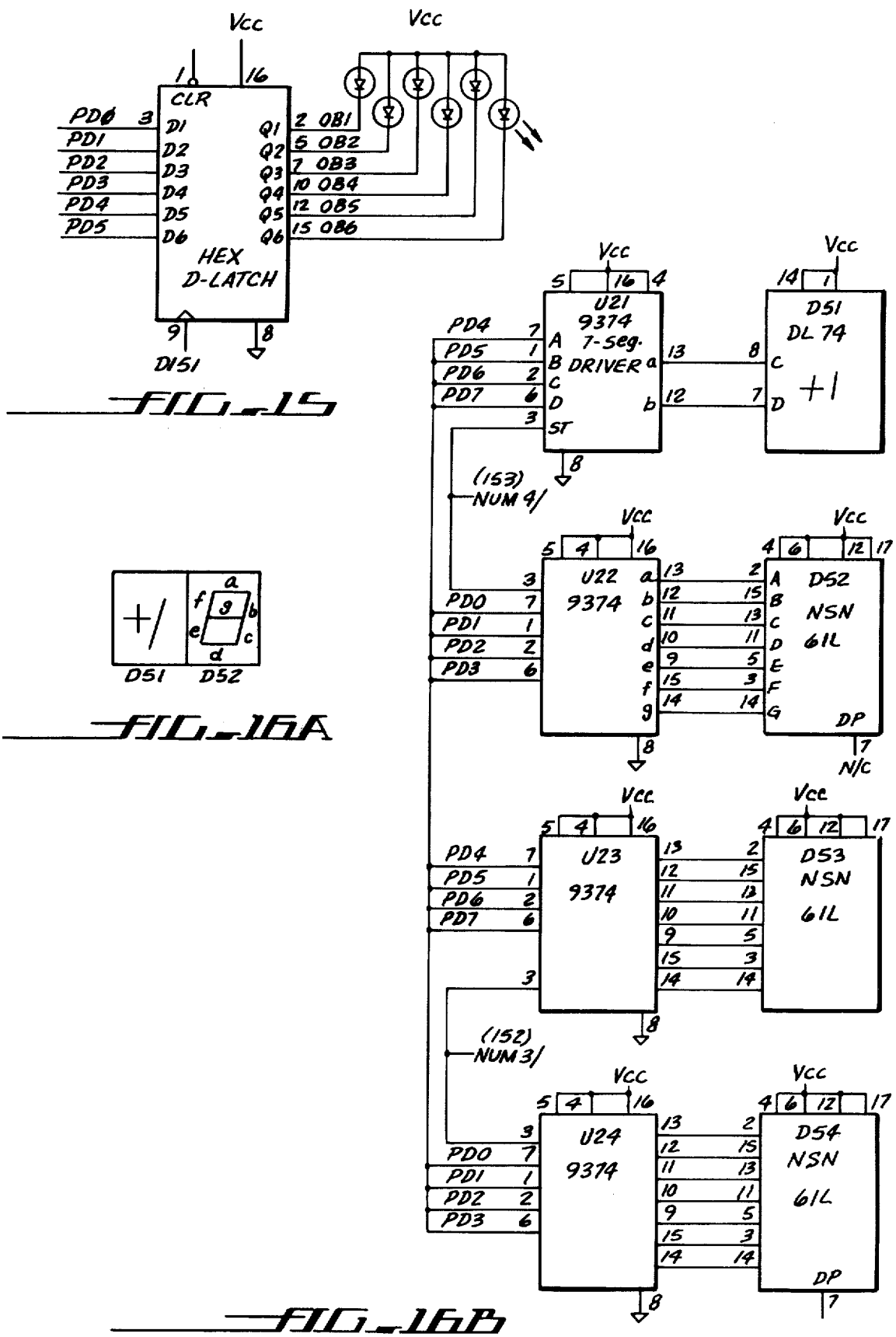

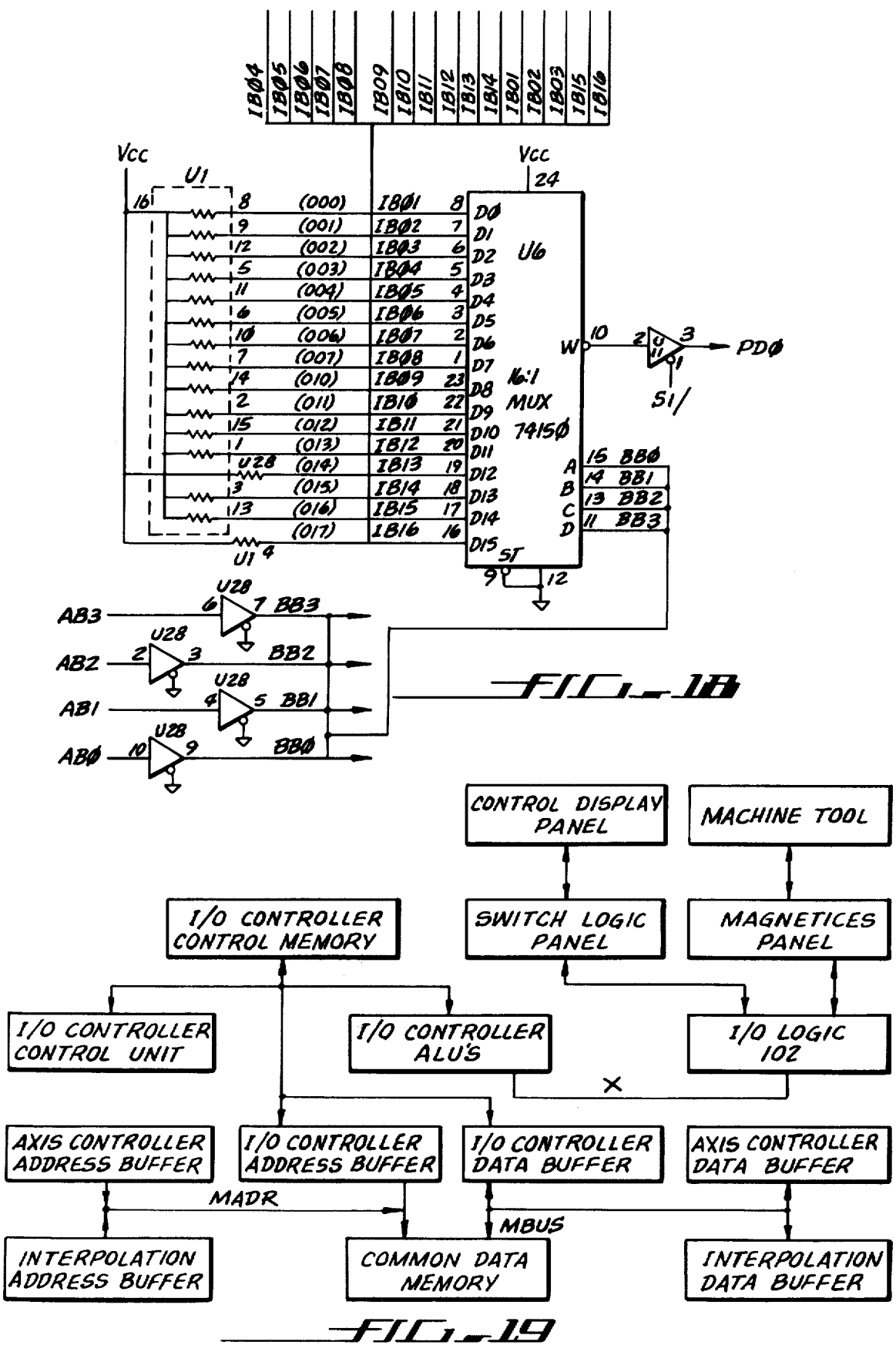

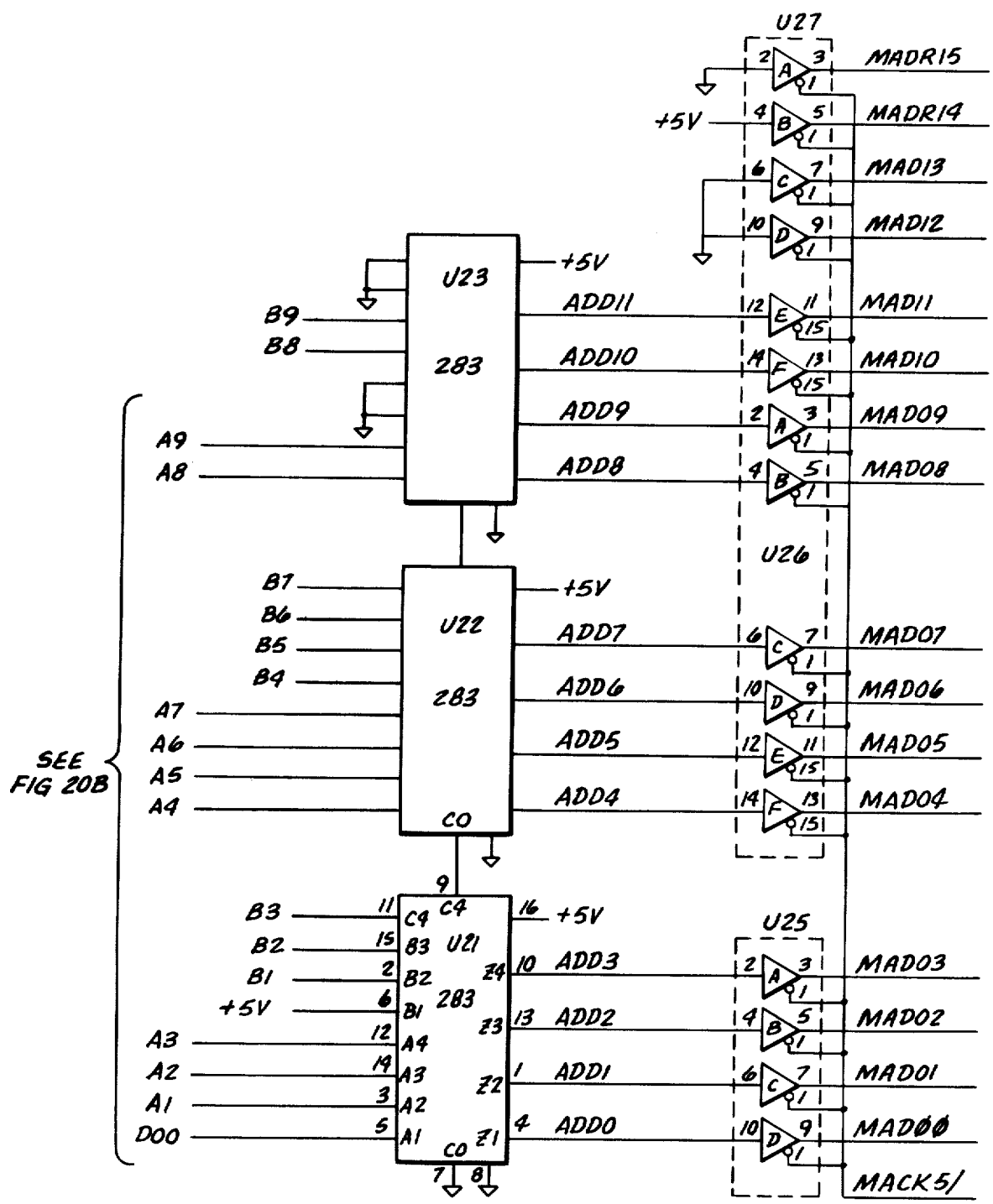
FIG_20A

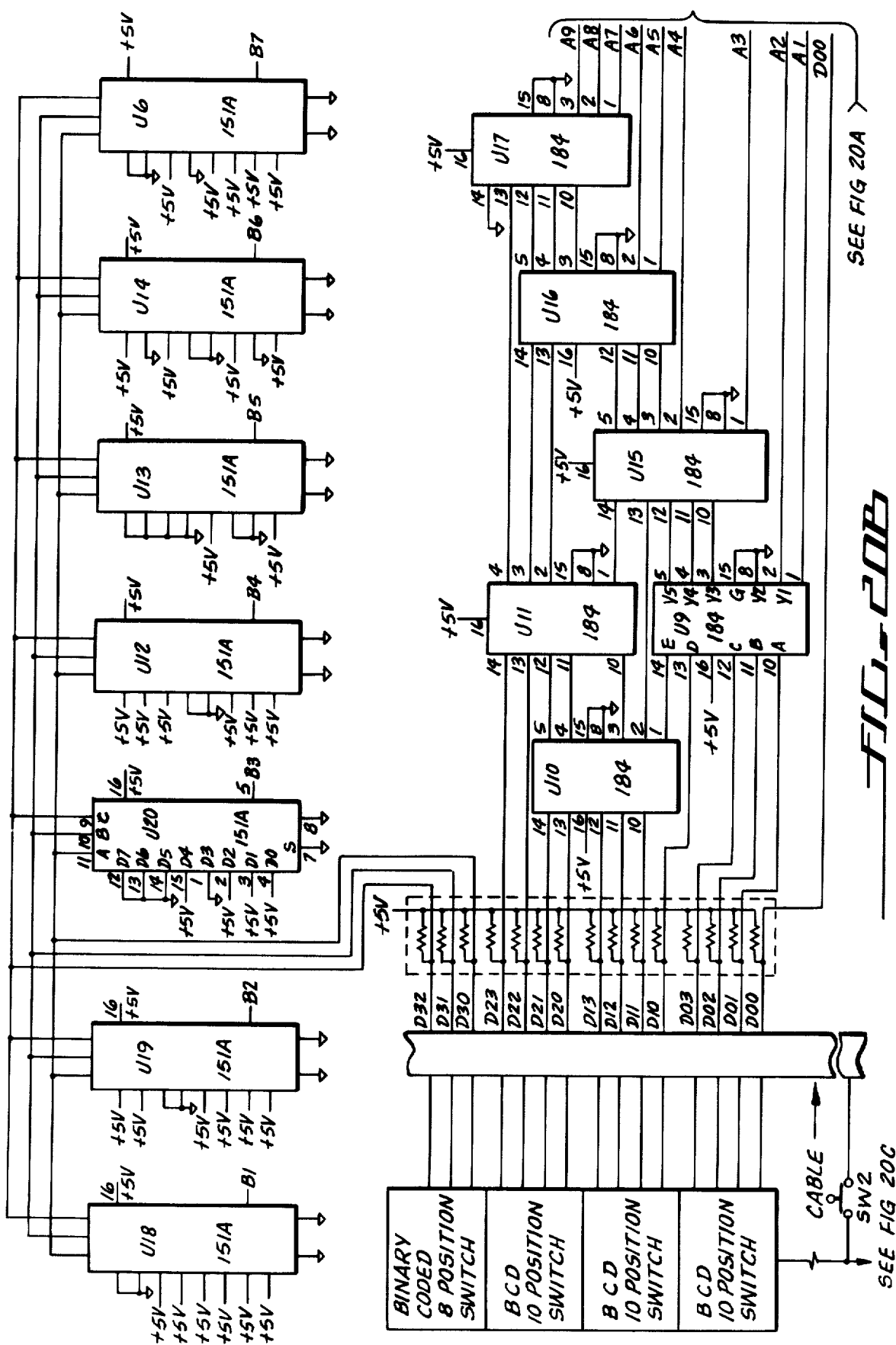

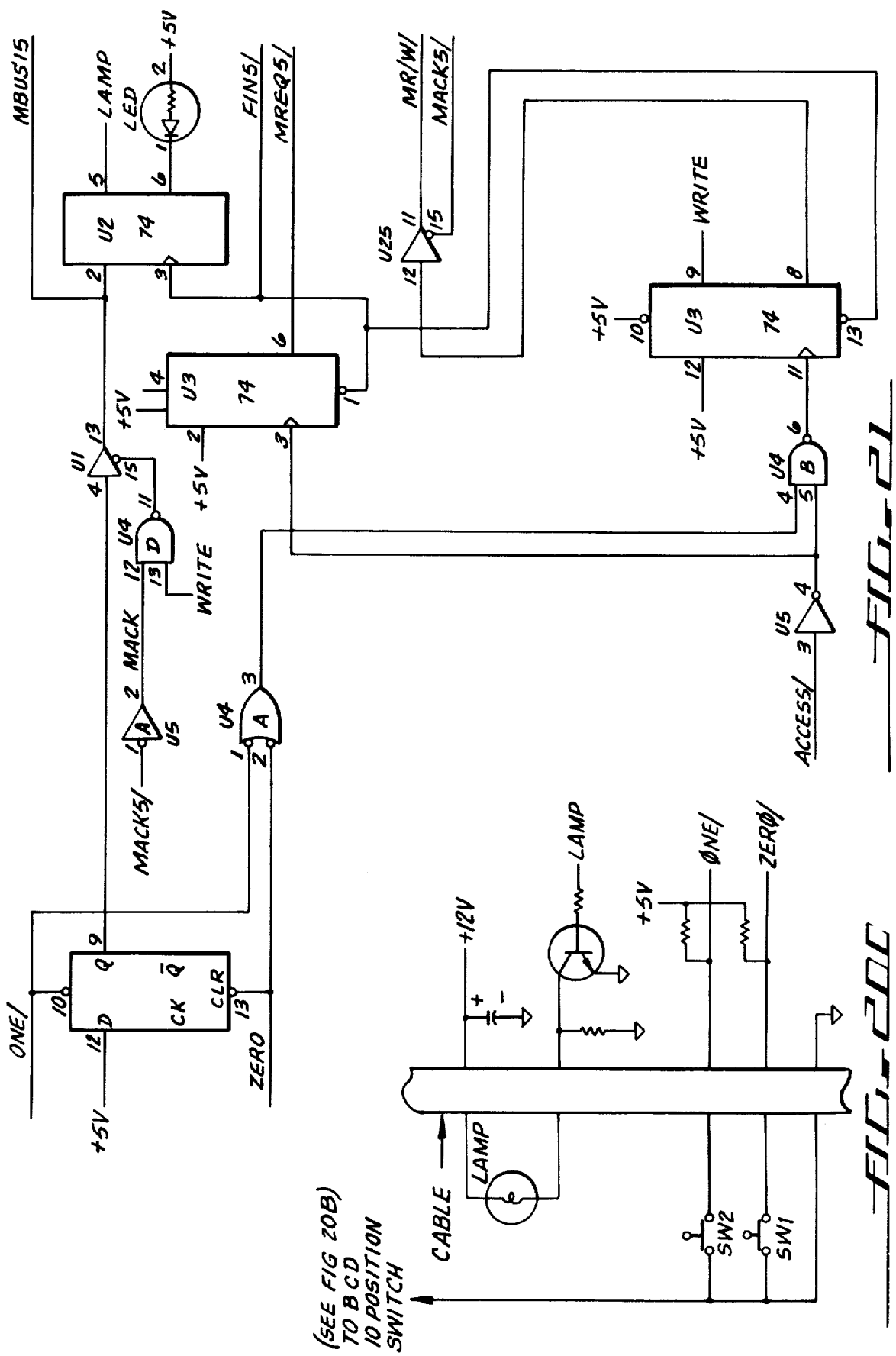

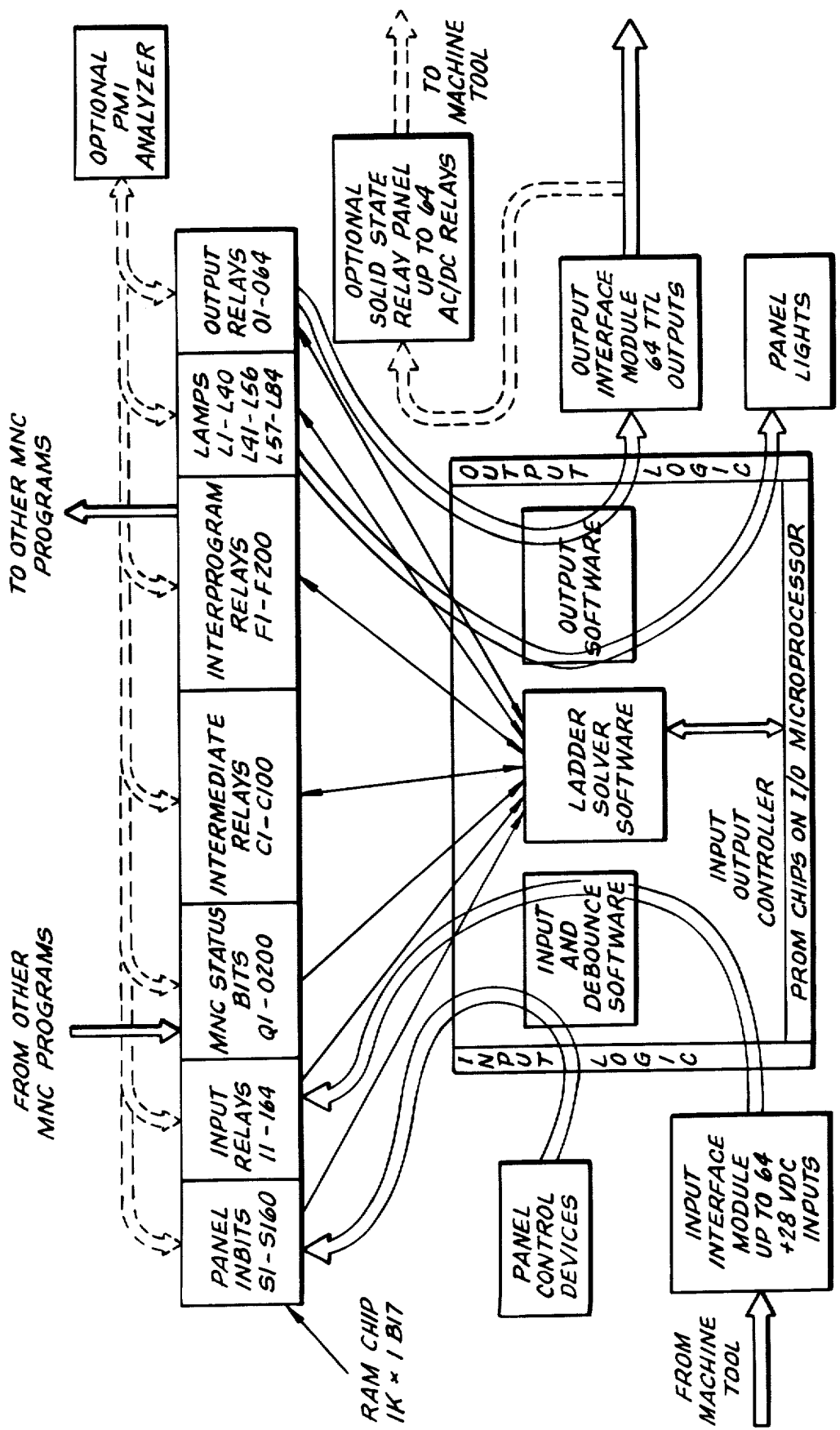

COMPUTER NUMERICAL CONTROL SYSTEM FOR MACHINE TOOL

BACKGROUND OF THE INVENTION

The present invention is used in the control of heavy machinery used in the fabrication of machined parts and more specifically pertains to the numerical control of such machinery through the use of microcomputers.

Control systems for machine shop machinery are available in several basic configurations. The conventional approach is to have gangs of relays used to control the machine. When an operator pushes a button, a relay is closed to supply power to the appropriate machine function. Other relays controlled by sensors, such as limit switches, would also be employed to control the machine or drive a display on the operator's control panel. Since these relay circuits are specific to the machine, each different kind of machine tool requires the design of a unique set of relay controls.

Machines under numerical control are used to simplify the duty of the operator in that a paper tape containing machine instructions is used to program the machine through an entire machining process. Thus, by implementing simple logic circuits with relays, by providing instructions through a paper tape and reader, and by relying on various internal sensors and solenoids, a machine can be controlled to complete entire sequences of operations without manual assistance. However, to customize a numerical control system to a particular machine tool or specific use, the relay controls must be redesigned.

More recently, control systems have been implemented on printed circuit boards containing logic implemented from integrated circuit devices. Power amplifiers are provided to drive motors and solenoids in the machine, and operator panel lights. This is a significant improvement since integrated circuits are more reliable and less costly than relay logic.

Regardless of the technology used to implement the machine tool system, there usually are specific characteristics of the machine tool, or the use to which it will be put, which necessitate a certain amount of modification. If the control system is implemented in hardware the result will be a redesign for each installation.

A computer may also be used to implement the logic functions required to control the machine tool. Here, inputs to the computer, such as switch closures on either the operator panel or the machine tool, are digitized and sensed by the computer. Likewise, outputs are generated to drive operator panel displays and machine functions such as interlocks, coolant flow, tool indexes, remote functions, alarms and other system dependent functions. In this case the computer numerical control system software is used to customize the system to the particular end use.

A problem associated with a computed used for this purpose is that the computer programs written for each machine are necessarily different, resulting in the necessity of modifying the basic program for each new use. For example, the programs for controlling turret latches would be different from programs controlling milling machines. Beyond that, however, even identical machines used under differing circumstances would require individual programs.

These computer programs are usually written by computer specialists who may not be coveniently available at the machine shop. Additionally, a computer specialist brought in to do the programming may not be expert on the particular machine tool, and the use to which it is to be put.

In consideration of the above problem it is clear that what is needed is a numerical control system, under computer control, which can be used for controlling any machine tool and which can be modified by a resident machine designer who is not necessarily skilled in computer technology.

SUMMARY OF THE INVENTION

The numerical control system described herein comprises a tape reader, a control display panel and three microcomputers connected to a common main memory or common data memory. This apparatus implements a numerical control system which may be used to control any kind of machine tool including turret lathes, drill presses, milling machines and machining centers. This system is tailored to each individual machine by implementing in one microcomputer control memory an equivalent of the entire relay logic structure that would be required to control the particular machine, while those operations specific to the particular part being machined are input to the system through a paper tape loaded onto the taper reader. The result is a system whose hardware may be used to control any machine tool and whose machining system-dependent functions (customizations) may be implemented by a machine designer rather than a computer specialist.

The basic system is designed so that only a small portion of the control needs to be reprogrammed to customize the control to specific requirements, and this only to provide special operational characteristics.

The first microcomputer in the system is used as an input/output controller. A logic equivalent of the relay structure of the machine is simulated in part of the control memory of this microcomputer, and the state of each hypothetical relay, i.e., whether the simulated relay contacts are closed or open, is contained in an associated bit of the common data memory as either a 1 or a 0 respectively. Further functions of the input/output controller are to control and receive information from the paper tape reader, to provide information to be displayed on the control display panel, to receive information from sensors and switches in the machine tool, and to provide power to the various functions of the machine tool. This input/output controller also may receive or transmit any of its data to the common data memory.

The second microcomputer is used to compute tool and part paths. For example, a command received by the system from the tape reader to cut a circular groove in a part must be converted into hundreds of discrete tool repositioning instructions so that the sum of these operations will result in a smooth curve. The generation of these smooth motion instructions is accomplished in this interpolator.

The third microcomputer is used as an axis controller, to provide appropriate position command signals to control the machine tool in as many as six axes of tool or part motion in accordance with the tool or part paths computed by the interpolator. These signals are used to control a servo circuit for each axis.

The resultant numerical control system is low in cost since almost all functions are implemented either in firmware or hardware in the form of integrated circuits which are inherently reliable and low in cost. The system is adaptable since the same hardware may be used to control any machine tool. Finally, this system is conveniently used by machine shop operators since the numerical control system is customized to a particular machine tool through the writing of programs which are equivalent to relay diagrams.

It is thus an object of this invention to provide a computer numerical control system which can be used on any machine tool and which can be programmed as though it were controlled by relays by a machine designer unskilled in the computer art.

BRIEF DESCRIPTION OF THE DRAWINGS

FIGS. 5, 6A, 6B, 6C and 7 are schematic diagrams of the microcomputer.

FIGS. 8, 9A and 9B are schematic diagrams of the common data memory.

FIGS. 10A, 10B and 11 are schematic diagrams of the input/output controller logic board.

FIGS. 12, 13, 14A and 14B are schematic diagrams of the magnetics panel.

FIGS 15, 16A and 16B are schematic diagrams of the LED display board.

FIGS. 17A, 17B and 18 are schematic diagrams of the switch logic board.

FIG. 19 is a block diagram of the numerical control system.

FIGS. 20A, 20B, 20C and 21 are schematic diagrams of the system analyzer and its associated circuits.

FIG. 22 is a system flow chart showing the data paths.

DETAILED DESCRIPTION OF THE INVENTION

Figure 1A:
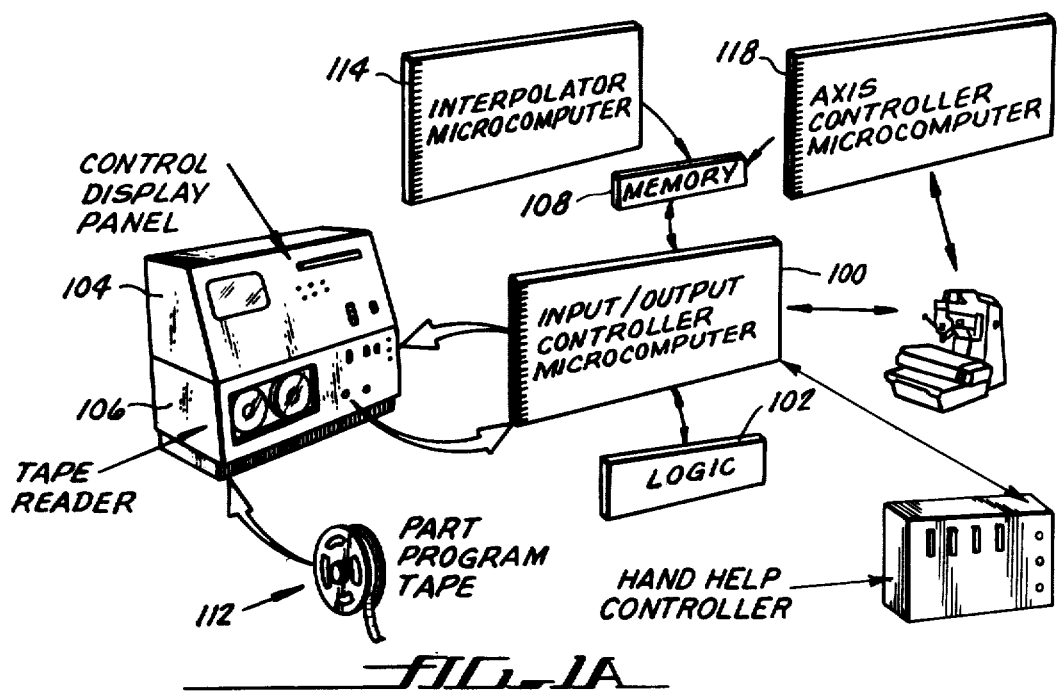
FIG. 1 is a pictorial diagram of the computer numerical control system.
FIG. 1B is a functional diagram of the numerical control system.

FIG. 1A is a pictorial diagram of this computer numerical control system showing its main components. Computer 100, the input/output controller, and its associated logic 102 controls the flow of information between the control display panel 104, the tape reader 106, the common data memory 108, and a machine tool 110. Numerical data for the machining of particular parts are read in from a tape 112, paper or magnetic, through the tape reader 106. This information is received by the input/output controller 100 and loaded into common data memory 108. Likewise, particular bits of information are received from the control display panel representing the status of various switches set by the operator, and various bits of information set by the machine tool such as the status of overlimit switches, temperature gauges, etc. Output from the input/output controller 100 is fed out to the control display panel to drive certain indicators and display lights, and other data is output to the machine tool to control various machine functions.

Computer 114 is an interpolator. It receives basic part shaping data from the paper tape reader 106 through the input/output controller 100 and from these simple commands representing curves of various kinds, generates detailed machine instructions in real time. As described above, a simple radius is comprised of a large number of discrete machine tool movements. The particular piece-by-piece movements are calculated in the interpolator 114 and output through the common data memory 108 to the axis controller 118.

Computer 119, the axis controller, controls up to six servo circuits corresponding to six axes of machine tool motion.

As shown in FIG. 1A, common data memory 108 is available to all three microcomputers, and all transfers of information from one computer to another comprise the loading of the particular information by one computer into common data memory 108 and the reading of that data from common data memory by the using computer. In addition to common data memory 108, each computer has its own control memory implemented from read only memory devices for permanent data storage and storage of control memory programs. As a general rule, programs and data stored in the control memory of the input/output controller 100 tailors the system to the particular machine tool while the data pertaining to the machining of a particular part is typically loaded in from tape 112 through the tape reader 106 and through the input/output controller to the common data memory 108 where it will be used by the interpolator to produce instructions for the machining of the particular part.

FIG. 1B is a more detailed functional block diagram of the system showing the three microcomputers.

In this diagram the flow of motion data, that is, the data used to control the motion of the part or tool in up to six axes of rotation, generally follows the path represented as a dotted line. The digital codes representing the tool or part motion for each axis are read from the tape reader through the input/output controller and loaded temporarily into the common data memory. These codes are similar or identical to codes that are normally received from the tape reader in prior art systems and define the beginning and end point of a part or tool and the path that the part or tool should take in going from the starting point to the end point. Tape reader data is stored in the 16 bit random access memory section of the common data memory.

The interpolator, which is the computer used to calculate the instantaneous tool and part positions, will access this data from common data memory and will compute the step by step motions in real time that will lead the tool or part through from the beginning point to the end point along the path designated by the tape reader data. These smooth motion data packets are then loaded back into common data memory where they are available to the axis controller computer for providing positioning information to six sets of servo circuits, each controlling an axis. The servo circuits provide an analog axis speed command to the motor driving each machine axis and receive an axis position feedback signal, closing the loop.

A second main channel of information transfer is used to control the digital functions of the machine tool. These functions are the turning on of coolant flow, the providing of power through interlock systems, the indexing of tools, and the turning on and subsequent speed selection of the spindle motor, for example. Data for controlling these discrete functions is read in from the tape reader through the input/output controller and are fed directly through the machine interface logic to control the machine. The I/O controller also collects data from the other microprocessors to output to the machine. The machine may likewise receive instructional data from the operator through the activation of various switches and push buttons on the control panel. The flow of this data is from the control panel through the switch logic, through the I/O controller and through the machine interface logic to the machine. Finally, data available at the I/O controller either from the tape reader or from the machine may be transmitted through the display board to the control panel for display to the operator.

The apparatus for controlling the on/off functions of the machine through information read from the tape reader or received from the control panel may be broadly referred to as the programmable machine interface since this apparatus serves the function of the various relays and circuits required in the prior art systems to control the machine functions as a result of information received from the tape reader. Since this machine interface is implemented, not from hardware but from a programmable computer, the reconfiguration of the system is accomplished by reprogramming the input-/output controller. Specifically,, the symbolic relay diagram required to tailor the numerical control system to the particular machine tool and to the particular use to which the machine tool will be put is referred to as programmable machine interface (PMI) data and is loaded into one part of the memory of the input/output controller which is implemented from programmable read only memory (PROM) devices. The remainder of the memory, comprising read only memory (ROM) devices is used to store the operating programs or instructions for the computer. Thus, the contents of the PROM and ROM memory provide operating instructions and data for the microcomputer. Given this configuration the input/output controller accomplishes the discrete inputs and outputs to and from the machine tool, tape reader control data input, data display, implements the programmable machine interface and drives the analog to digital converter. These functions will be discussed in more detail below.

The PMI data is in the form of symbolic relays to control all the functions of the machine tool, the relay implementations actually being one bit for each symbolic relay contact. The relay section of the common data memory therefore comprises a one bit by one thousand word random access memory, where each bit will either be on or off to symbolically represent whether the contact of each relay is closed or open. Using this system, the PMI data in the PROM of the input/output controller, therefore, is simply a collection of addresses of bits in the common data memory and corresponding functions. Since the "relays" are contained within the common data memory and input/output controller memory, it is programmable since any combination of relay functions may be implemented simply by reprogramming the PMI PROM's on the input/output controller.

The common data memory also contains a 16 bit RAM for temporary storage of the motion data received from the tape reader and an 8 bit ×1K programmable read only memory for storing pertinent machine configuration data.

The interpolator comprises a microcomputer and programs stored in a read only memory. The interpolator receives motion commands from the tape reader through the common data memory and generates smooth motions in real time which are reloaded into common data memory for reference by the axis controller. One input to the interpolator is spindle speed and position information which is received through a circuit board containing tachometer and position detector from a position transducer attached to the spindle. In addition, a timer circuit provides a real time reference.

The axis controller is also a microcomputer comprising a read only memory. The function of this computer is to drive six servo circuits. The axis controller receives actual position information from the machine tool indicating the actual position of the axis to be controlled, receives motion commands from the interpolator through the common data memory as to the desired position, and outputs to the servo circuits a speed command proportional to the difference.

FIG. 1B, then, is an overall functional diagram of the system. Each particular part of the system will now be discussed in more detail.

Figure 2:
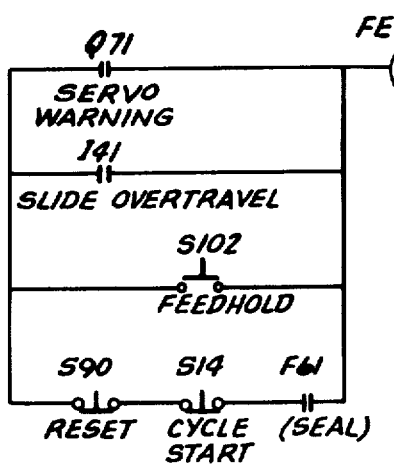
FIG. 2 is a section of a typical ladder diagram.

The input/output controller contains within its control memory a digital representation of a relay ladder diagram which defines the control system for the machine tool. A part of a typical ladder diagram is shown in FIG. 2 and shows the typical relay control system required to stop motion in all axes (called a "feed hold"). In a machine controlled by relays, a relay, here specified as F61, will be provided to stop the motion of the axes. This relay will be thrown if a problem is detected by the servo monitoring system. In this case, a Q71 relay contact indicating a servo problem may be closed activating relay F61. The axis will be secured until the servo problem is cleared up. Likewise, if a slide overtravel is detected, contact I41 will be closed, also enabling the feed hold and this also will inhibit motion of the appropriate axis until the slide overtravel switch has been opened. S102 is a feed hold switch on the control display panel. Perhaps the operator saw something and momentarily depressed the switch, enabling the feed hold. The last rung of the ladder diagram shows a reset switch S90, a cycle start switch S14 and a contact F61 of the feed hold relay itself. Thus, whenever the feed hold relay is thrown, the contact F61 will lock the feed hold relay in until either the cycle start switch or the reset switch, both typically on the control display panel, are depressed. Thus, once there is a feed hold, the operator must affirmatively restart the system, presumably after clearing the malfunction that necessitated a feed hold in the first place, before operation may normally resume.

A relay controlled machine would be implemented exactly in this fashion. However, in the preferred embodiment of this invention no relays are used to control the machine. In fact, the entire relay structure is implemented in read-only memory devices in the control memory of the input/output controller. Each relay, as for example F61, is actually an address stored in the input/output controller 100 control memory, that address specifying a bit of RAM memory in the common data memory, which bit represents, by a 1 or 0, whether the "relay contact" is closed or open. LIkewise, the state of Q71, I41, S102, etc., are also states of bits in the common data memory. Thus, the operation of the relay circuit shown in FIG. 2 actually is accomplished in the input/output controller by serially inspecting each required bit of information in the common data memory and threading a decision tree according to the states of the bits accessed.

Figure 3A:
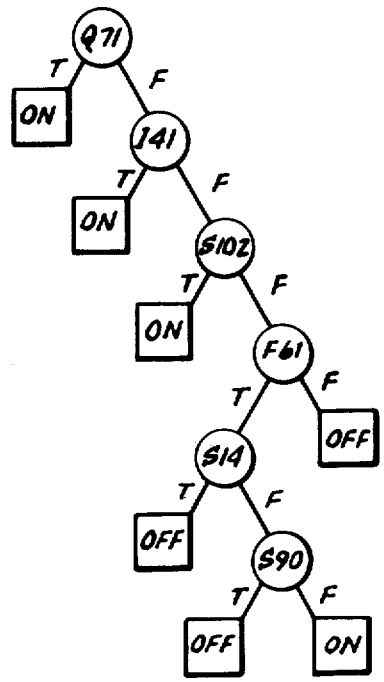
FIG. 3A is a decision tree based on the ladder diagram of FIG. 2.

FIG. 3A is a flow chart of the program execution that corresponds to the relay circuit of FIG. 2. As shown, to solve for the status of F61, first the Q71 bit in common data memory is inspected. If it is true, F61 is turned on and the program is finished. However, if Q71 is false then I41 is inspected. The program continues on through S102, F61, etc., until a decision is made as to the status of F61. The program then goes on to the first rung of the next ladder.

The program corresponding to this flow chart is as follows:

Q71 on next
I41 on next
S102 on next
F61 next off
S14 off next
S90 off on

This high level language program is fed into an off line assembler where the relays are interpreted as addresses of bits of memory in common data memory and where the decisions as to whether to turn on or off F61 (which is itself a bit), or to go to the next decision, are assembled. This program is then encoded onto PROM memory devices and becomes the PMI data processed by one of the control memory programs of the input/output controller 100. In this way, the input/output controller is customized to the particular machine in that the relay structure required by the machine and by an individual user can be encoded into the input/output controller. Thus, the same system hardware may be used to control a wide variety of machines and can be used in a variety of applications; since the system is programmed by the above process to the particular use of each machine.

It can now be seen that a computer programmer is not required to customize the control system to the machine since the entire program is written in relay language which is easily understandable by machine designers. Thus, the user can customize his system to his own particular use rather than be required to rely on computer programmers. For instance, any additional switches on the machine or lights on the operator panel are simply designated by an S or L number and are written into the ladder diagram allowing the machine designer to define the circumstances under which the switches will be read and the lights will be lit.

Figure 3B:
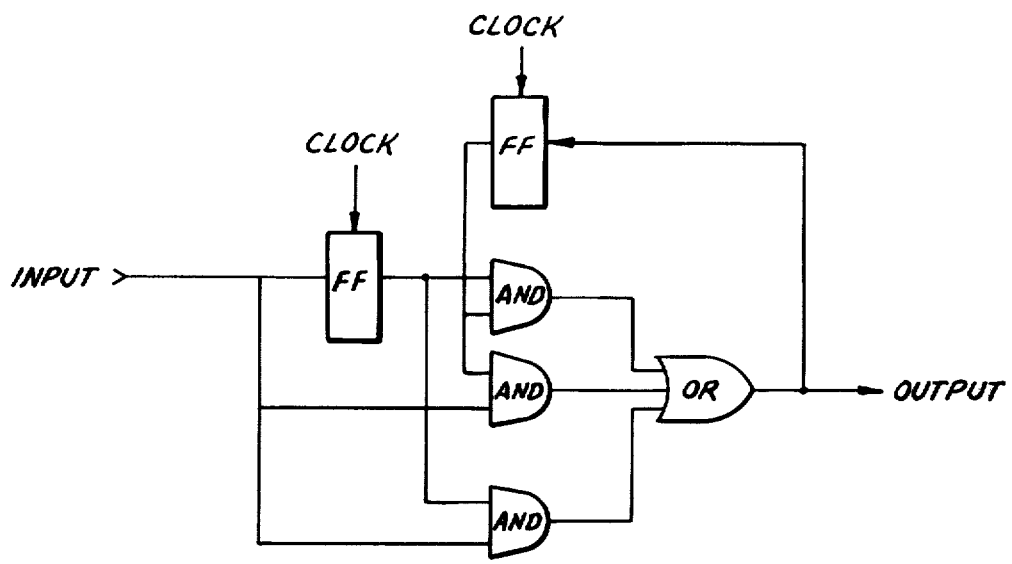
FIG. 3B is a simplified schematic of a data debouncing circuit.

A problem that arises in numerical control machinery is that signals received from the machine tool switches are inherently noisy, subject as they are to vibration, dirt, contact bounce and noise pickup. Therefore, not only must the system input these signals but must also debounce the data to get it into usable form and filter out the spurious noise generated in the process of these switch closures. Also, since information is received from the machine tool in 16 bit words, some method of debouncing this information in parallel is required. The logical equation developed for this purpose is written as follows, $$Q_t = (I_t(Q_{t-1} + I_{t-1})) + (Q_{t-1} \cdot I_{t-1}),$$

where
$Q_t$ = "debounced" input state at time t and
$I_t$ = input state at time t,
and may be implemented either in hardware or software, since the equation fully describes both implementations. In the preferred embodiment, it was implemented in the firmware as a control memory subroutine. The equivalent hardware circuit for one switch bit implemented from AND gates, OR gates and Flip Flops is shown in FIG. 3B.

The algorithm operates an the entire 16 bit word in parallel and may be verbally described as a vote taking algorithm where the immediate input, the last input and the result of the previous iteration of this algorithm are inspected. If the input status of a bit is the same this time and last time then it is decided that is the correct input. If the inputs this time and last time are different, then the result of the previous iteration of this algorithm is used. In effect is is a vote taking mechanism where two votes out of three are required to decide the status of the particular bit. Notice also that this algorithm, as shown in the logical equation, may be used to operate on entire 16 bit words in parallel and will yield the proper result for each bit. This algorithm is implemented 20 times a second so that the input/output controller is always supplied with the current status but where enough time is allowed between iterations to allow for switch settling time. This algorithm is used to operate on data received from the machine tool as well as data received from the control display panel. However, information received from the common data memory need not be debounced since it is already in "clean" binary form.

Figure 4:
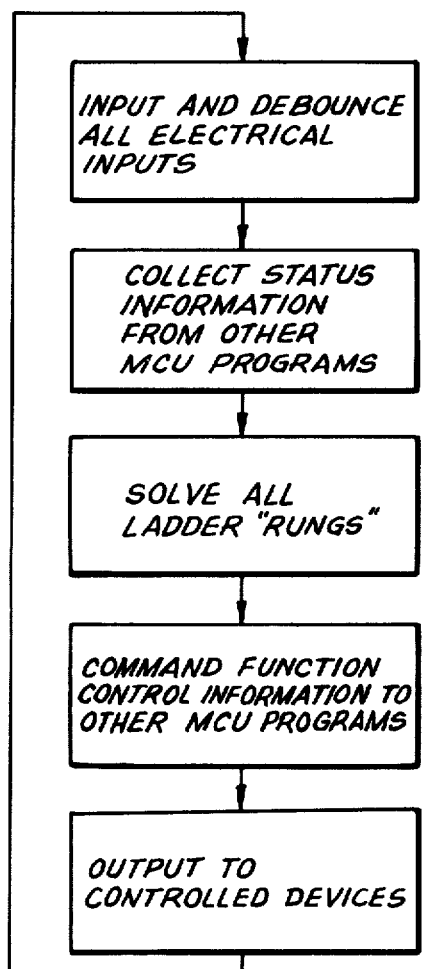
FIG. 4 is a flow chart of the data processed by the input/output controller.

FIG. 4 shows the overall flow diagram used by the input/output controller in receiving information solving the ladder diagrams and outputting the results to the machine. First, all inputs are received and debounced. There are a total of 160 S bits corresponding to various switch positions on the operator's panel, and an additional 64 I bits available to specify the machine status. Operator panel switch functions include cycle start and feed hold while machine status information represents overtravel, alarms, etc. Next, the input/output controller receives status information from other numerical control system processors. These 200 "Q bits" are used as flags to represent information developed by other programs, such as servo error and cycle on codes.

Next, the input/output controller services all of the ladder diagrams.

Finally, the input/output controller outputs various command functions to the rest of the system. Two hundred F bits command machine functions such as jog, cycle start, and feed hold, 40 "L bits" are used to specify lights on the operator panel corresponding to various machine functions, and 64 "O bits" are output to the machine which controls coolant flow, spindle speed, etc.

In addition to Q, L, F, I, S and O bits, a relay diagram may also have relays and corresponding contacts that are designated by the letter C. These relays are used where a logical function is required to implement the equivalent of a one shot, a flip-flop, or a shift register, and where a functional relay cannot be used for this purpose. In other words, C relays are supplied so that the machine operator writing the program may design into the system certain logical functions that he may find convenient. These C relays will then appear in the ladder diagrams but will have no corresponding system function.

As shown in FIG. 4, the system will collect information, solve all the ladder rungs and output various commands at a rate of 10 iterations per second. The data is input 20 times per second but the ladder is solved 10 times per second. The data is input twice as often to allow debouncing at a higher rate. All inputs and outputs are at logic power levels, except for the O bits which need to run machine tool functions and are output at a voltage of 115 volts at two to three amperes.

Figure 6A:
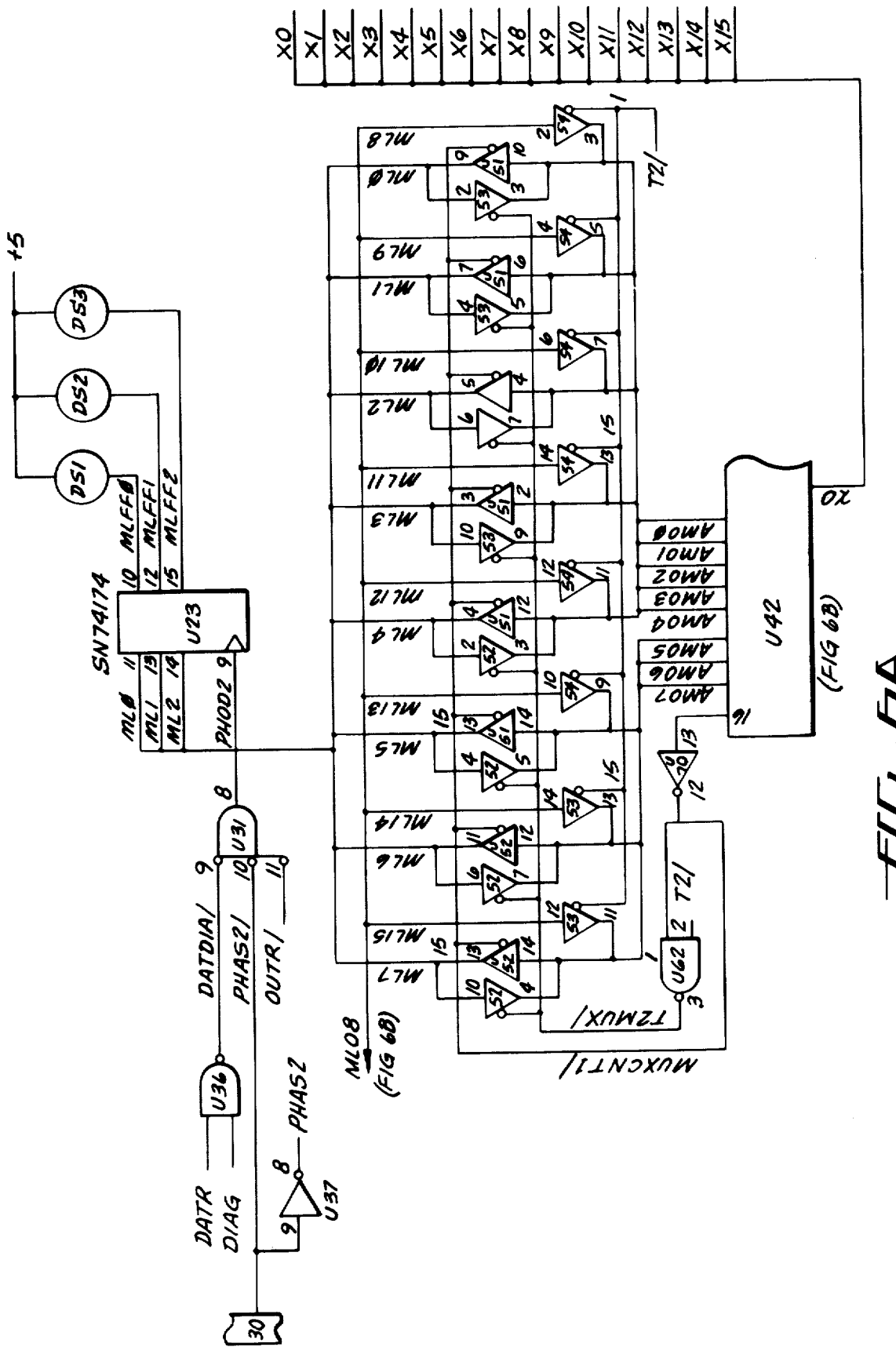
Figure 7:
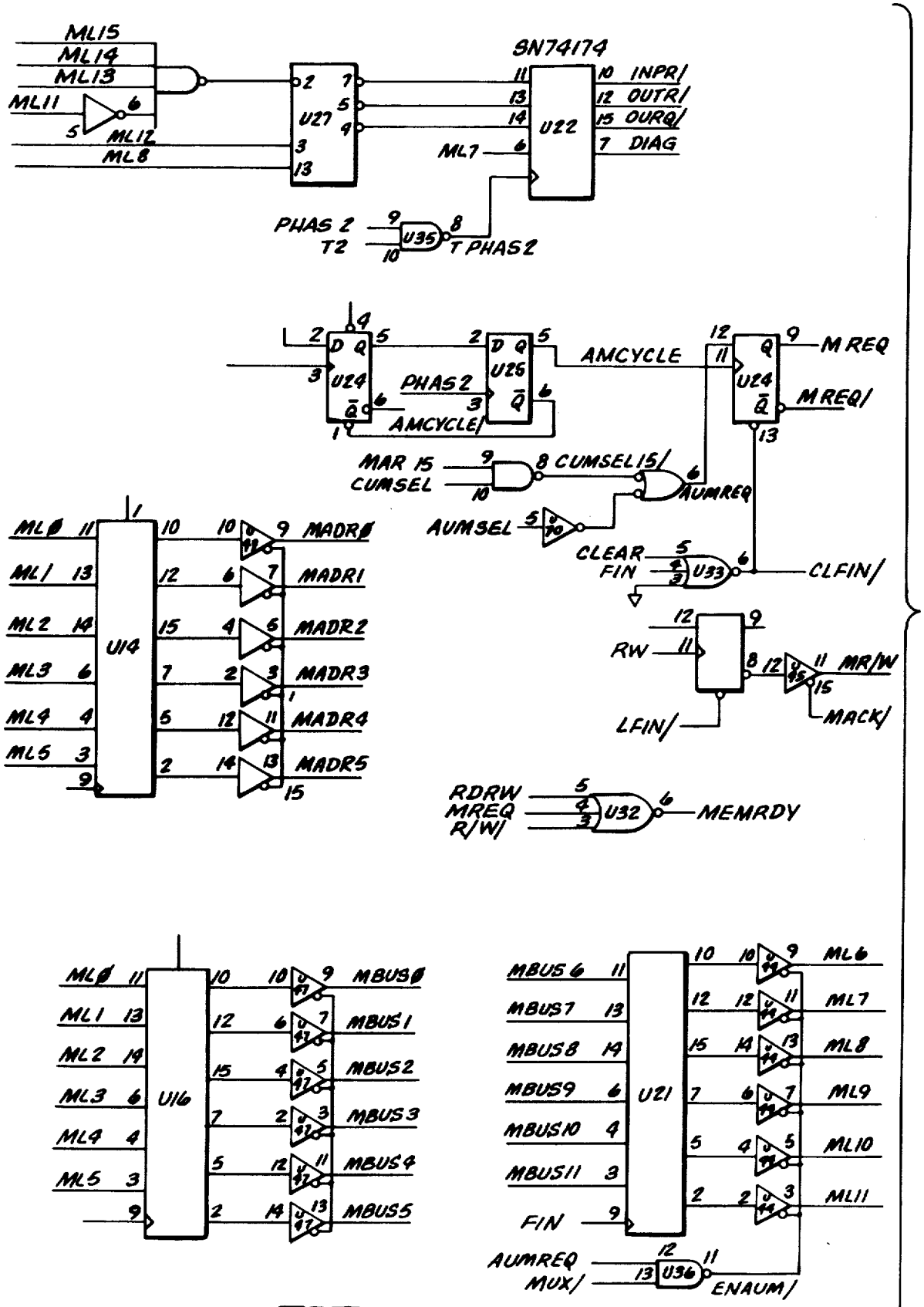

The input/output controller, the interpolator and the axis controller computers, including control memory are identical and are shown in schematic form in FIGS. 5, 6 and 7.

In FIG. 5, devices U1 through U4 are 8 bit by 1K programmable read-only memory (PROM) devices. The computer contains 14 of these devices but only four are shown because the remaining circuits are identical. In the input/output controller anywhere from two to eight of these PROM's are used to contain the ladder diagrams which normally will consist of hundreds of rungs, containing several contacts per rung. The ladder diagrams are housed in the first two to eight PROM's and the remaining PROM's contain the control memory programs. The devices receive their addressing information on address lines MAR0 through MAR9 and the 8 bit data words are output on lines CUM0 through CUM7. Since the computer is organized around a 16 bit word length, these PROM's are always used in pairs with the second PROM of each pair supplying the other 8 bits of the data word, CUM8 through CUM15. The devices are selected through select lines AZERO, A1K, etc. Addressing information is received on lines ML0 through ML15 and is temporarily stored in registers U11, U12, and U13 during the PROM read and write cycle. Decoder U28 decodes the high order address bits into device select bits AZERO through A6K. The addresses received at lines ML0 through ML15 are received from the circuits shown on FIGS. 6A, 6B and 6C. The 16 bit output data words are buffered through devices U58, U59, and U60 of FIG. 5 and are output on lines ML0 through ML15, which is a bi-directional data bus between the schematic shown in FIG. 6 and this control memory.

The bi-directional ML address and data bus is shown on FIGS. 6A, B and C as lines ML00 through ML15. Tri state devices U51 through U73 are used to direct either address data out to the control memory or to direct data or instructions back from the control memory.

This data and instruction information is received by the computer, which is a 3 chip set of U40 of FIG. 6C and U41, and U42 of FIG. 6B on lines AM00 through AM15 and CM0 through CM7. Device U40 is an instruction controller and decoder and devices U41 and U42 are each 8 bit arithmetic logic units (ALU). The entire 3 chip set therefore comprises a 16 bit microcomputer. In a typical operation, instruction information is received from the control memory at the decoder U40 instruction decoder at lines CM0 through AM15 where they will be interpreted. The appropriate control lines from decoder U40, TC1 through TC4, direct ALU U41 and U42 to operate on the data being received at data lines AM00 through AM15 or instruct arithmetic logic units U41 and U42 to output certain data on lines AM00 through AM15.

A second set of 16 data input/output lines are provided to the arithmetic logic units U41 and U42 through lines X0 through X15. As will be described below this is the data link between the computer unit and the machine tool interface. The 3 chip set comprising this microcomputer U40, U41 and U42 are typical instruction decoder and arithmetic logic units, similar to Motorola Part No. 6800.

At the bottom of FIG. 6C is a diagnostic switch which, when depressed, generates a discrete signal activating the execution of a diagnostic subroutine contained within the control memory. The results of this diagnostic routine are transmitted to device U23 of FIG. 6A through data lines ML0 through ML2 and result in a coded pattern of lights displayed by lamps DS1 through DS3. The remainder of the logic in FIGS. 6A, B, and C generates miscellaneous logical functions.

FIG. 7 is a schematic of the remainder of the data bus structure. Because of the redundant nature of the circuits only six in each set of 16 address lines are shown. The common data memory board receives its addressing information on MADR0 through MADR15 through register U14 from the ML line of the microcomputer data bus. In a similar fashion the common data memory board data bus is driven by lines MBUS0 through MBUS15 through register U16 from the same ML lines. Finally, data from the common data memory is received through lines MBUS0 through MBUS15 and are transmitted through register U21 to the ML lines of the computer. Some memory cycle logic is also shown in this diagram. The logic provides that when a computer requests a memory cycle, it is put into a hold state until that memory cycle has been granted. At the conclusion of the memory cycle the data will either have been rated out of or read into the common data memory.

Figure 8:
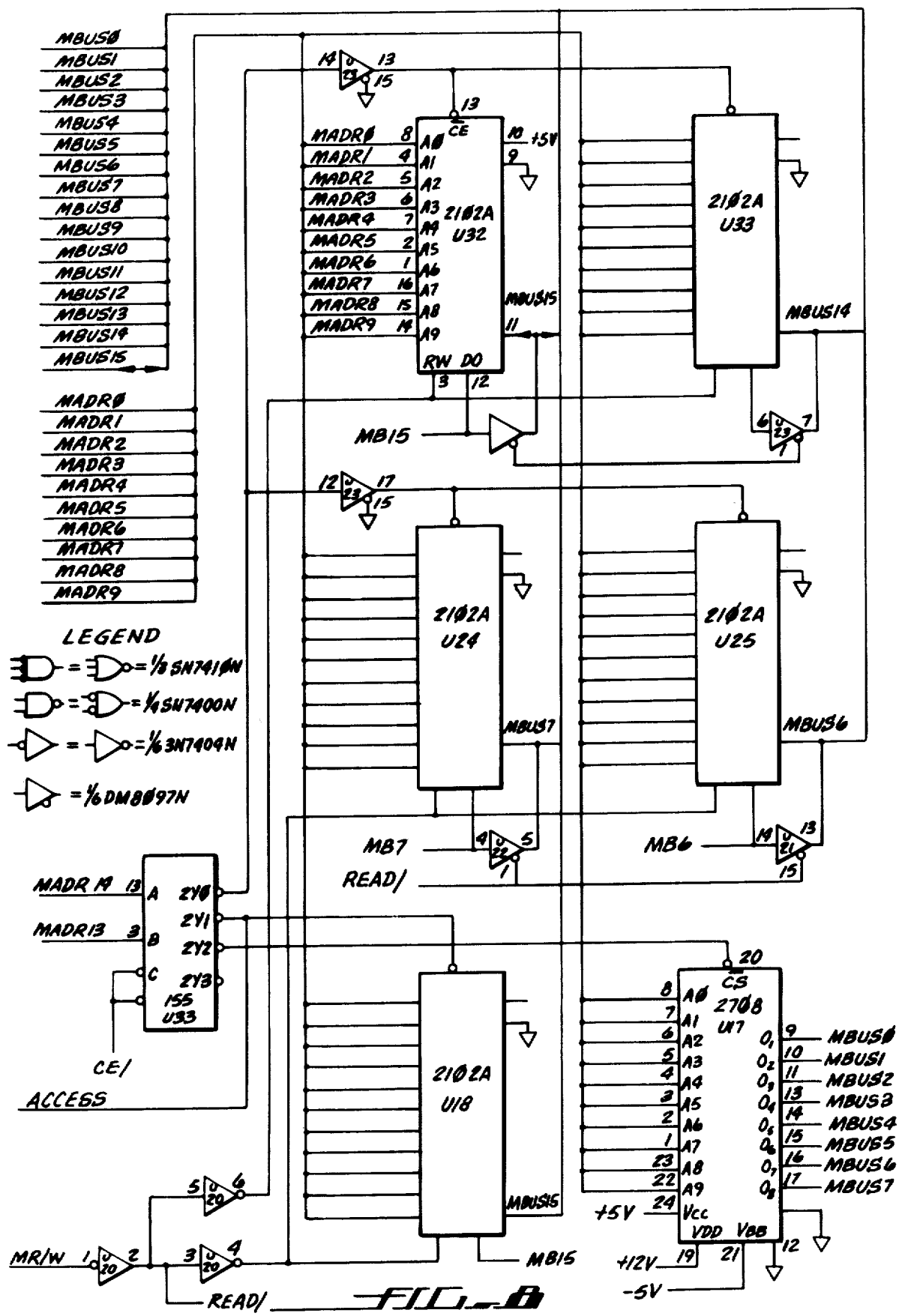

FIGS. 8, 9A and 9B are schematics of the common data memory. FIG. 8 is a schematic of the memory devices themselves. There are 16 1K (1024) by 1 bit RAM devices identified as U24 through U39. Because of the redundant nature of this memory, only devices U24, U25, U32 and U33 are shown. Since the 16 bit devices are used in parallel the capacity of this random access memory is 1K × 16 bit words. The devices are addressed in parallel through addressing lines MADR0 through MADR9 which are received from the computer unit. Each device contributes one bit and an assembled 16 bit word is output on lines MBUS0 through MBUS15. Pin 11 of the device is both an input and an output and therefore the MBUS lines constitute a bi-directional 16 bit data bus communicating with the computer unit as shown in FIG. 7.

An additional two memory devices, U18 and U17, are also provided in this common data memory schematic. U18 is a 1K by one bit RAM containing the status of all the "relays" of the system. This is the RAM which contains the zero and one bits corresponding to the closed or open relay contacts of the ladder diagrams stored in the permanent memory of the input/output controller. This device is also addressed by addressing lines MADR0 through 9 and the 1 bit input/output is communicated to the input/output controller on line MBUS15.

ERASABLE PROM U17 is a 1K by 8 bit device erasable and programmable by the user to store various parameters of the individual machine that are relatively permanent but may change from machine to machine. Examples of these parameters are data format and servo stiffness slopes and breakpoints. These are values that remain fixed for long periods of time but may be changed by the user from time to time to accommodate machine wear or a different mode of use. In its real time computations the axis controller 114 will need this data to compute tool speed and position. This device is also addressed through lines MADR0 through MADR9 and its output is supplied to the bi-directional data lines MBUS0 through MBUS7.

FIGS. 9A and B are a schematic of the time sharing logic associated with this memory. Eight ports enable the honoring of memory requests of up to 8 microcomputers on request lines AXMREQ through MREQ8/. Only one computer at a time is actually accessing memory, the others are put on hold until the accessing becomes possible. If a request line is honored by an enabling signal on any one of lines P1 through P8, an acknowledge signal is returned to the computer on lines AXMACK/ through MACK8. The memory transaction will be executed and a finish signal will be received by the computer on one of lines AXFIN/ through FIN8/ to release the bus for some other computer.

A three megacycle clock is generated by oscillator U16 of FIG. 9B and various clock phases and synchronizing signals are generated in the associated logic.

The input/output controller logic board, shown in schematic form in FIGS. 10A, 10B and 11 operates in partnership with the input/output controller computer. Address selection of various devices, and tape reader control is accomplished by using the address bus from the microcomputer selecting the device address which is decoded to direct signals through the logic to specific devices. Devices U5, U15, U24 of FIG. 10A and their associated circuits receive addressing information from the input/output controller and generate signals on appropriate addressing lines to address specific devices such as the operator display panel, the tape reader, and the D to A converter. Device U26 to FIG. 10B generates logic signals to drive the tape reader stepping motion through control lines ABASE, BBASE and CBASE. Device U8 generates rewind and fast forward signals which are sent to the tape reader, and the circuit associated with devices U25 and U49 comprise the tape reader interrupt logic.

FIG. 11 is that part of the input/output controller logic board that directs data between the X bus of the input/output controller and the control display panel and the machine tool. The operator panel is that collection of switches and lights on the operator display panel available to the operator. The magnetics panel is an interface board between the system and the motors and switches constituting the electrical power devices on the machine tool. As shown in FIG. 11, the X bus communicates through lines IOX00 through IOX11 and through tri state devices to lines D0 through D11 which is a bi-directional data coupler to the magnetics panel. In the other direction, information is received from the magnetics panel from lines D0 through D7 and driven through tri state devices U20 and U14 to the X register lines IOX00 through IOX07. Finally, 8 bit words from the tape reader are received in parallel on lines TDATA0 through TDATA7 and through tri state devices U10, U7 and U28 to be sent to the X register of the input/output controller through lines IOX00 through IOX09. Thus, information may be transmitted in both directions between the input/output controller, the tape reader and the magnetics panel of the machine tool.

Figure 12:
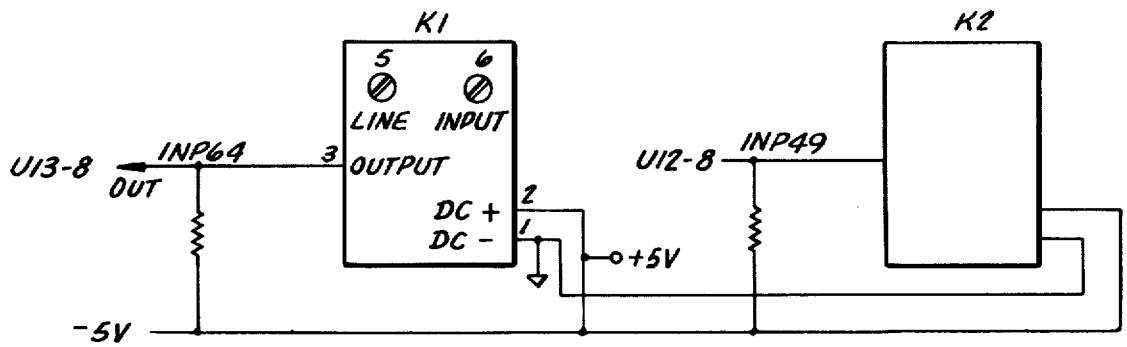

FIGS. 12, 13, 14A and 14B are a schematic of the magnetics panel which interfaces between the input/output controller logic board and the machine tool. FIG. 12 shows two devices for changing the levels from 115 AC used at the machine to logic levels used in the remainder of the system. Sixty-four of these level converters are supplied in the system but because of the redundant nature of the schematic only two are shown. The input to K1 is a 115 volt ac signal applied to pins 5 and 6 and the output is taken from pin 3 and is wired through line INP64 to the input/output controller logic board.

Figure 13:
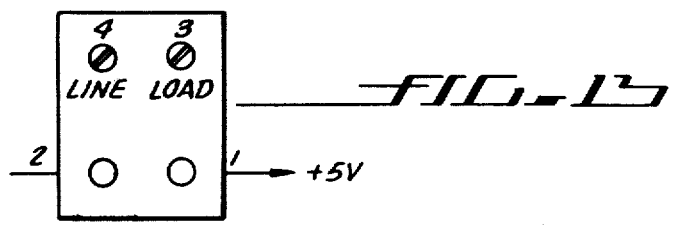

Similarly, in FIG. 13, a logic level to 115 volt ac converter is shown. Sixty-four of these converters are supplied with the system but only one is shown due to the redundant nature of the schematic. The input digital level is applied at pin 2 and the ac voltage to the machine tool function is supplied through pins 3 and 4.

Figure 14A:
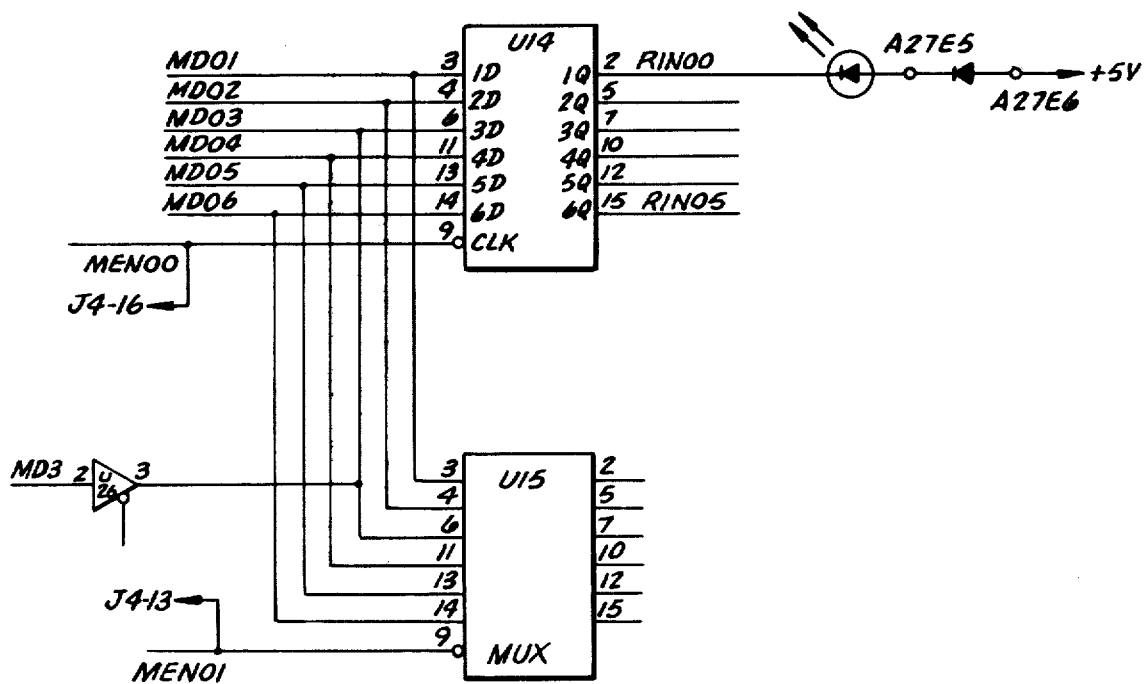

The remainder of the magnetics panel is shown in FIGS. 14A and B. I bits from the machine tool are supplied through the K lines to multiplexer U10 of FIG. 14B. Four identical circuits are contained in this system but only one is shown due to the redundant nature of this circuit. Each of the four multiplexers is controlled by four control lines, AB0 through AB3, and the four multiplexers output to the machine on four data lines MD3 through MD6. Thus, the four data lines contain any four of an input possibility of 64 I bits from the input/output controller. These 64 bits are loaded into 11 latches, two of which, U14 and U15, are shown in FIG. 14A. Each latch is enabled by an enable line MEN00 through MEN09 so that each latch may be loaded with the appropriate I bits. Therefore, through this multiplexing and latch storage mechanism, the entire 64 bits of I data, received four bits at a time, may be presented simultaneously to the input/output logic board. Decoders U2 and U3 of FIG. 14B synchronize the latch selection signals MEN00 through MEN10 with the multiplexer control lines AB0 through AB3 so that the 4 bits of data received from the machine will correspond to the 4 bits of data loaded into the appropriate multiplexer, U14 through U24. The remainder of the logic in FIG. 14B is synchronizing logic. The data channel from this magnetics panel to the input/output controller is 4 bits wide. Thus, 4 bits at a time will be read from latches U14 through U24 into the input/output controller where they will be combined into 16 bit data words for debouncing and subsequent use by the system.

FIGS. 15 and 16B are schematics of the LED display board in the control display panel which transmits logic signals to the LED's of the control display panel. FIG. 15 is the representative schematic of one of the circuits showing latch U11 receiving data from the input/output logic board on lines PD0 through PD5 and delivering signals to six LED's on the control panel.

FIG. 16B shows the logic required to drive the numerical displays. Here numerical data is received from the input/output controller logic board on lines PD0 through PD7. The resulting displays are shown on the indicating face of devices D51 and D52 of FIG. 16A.

Figure 17A:
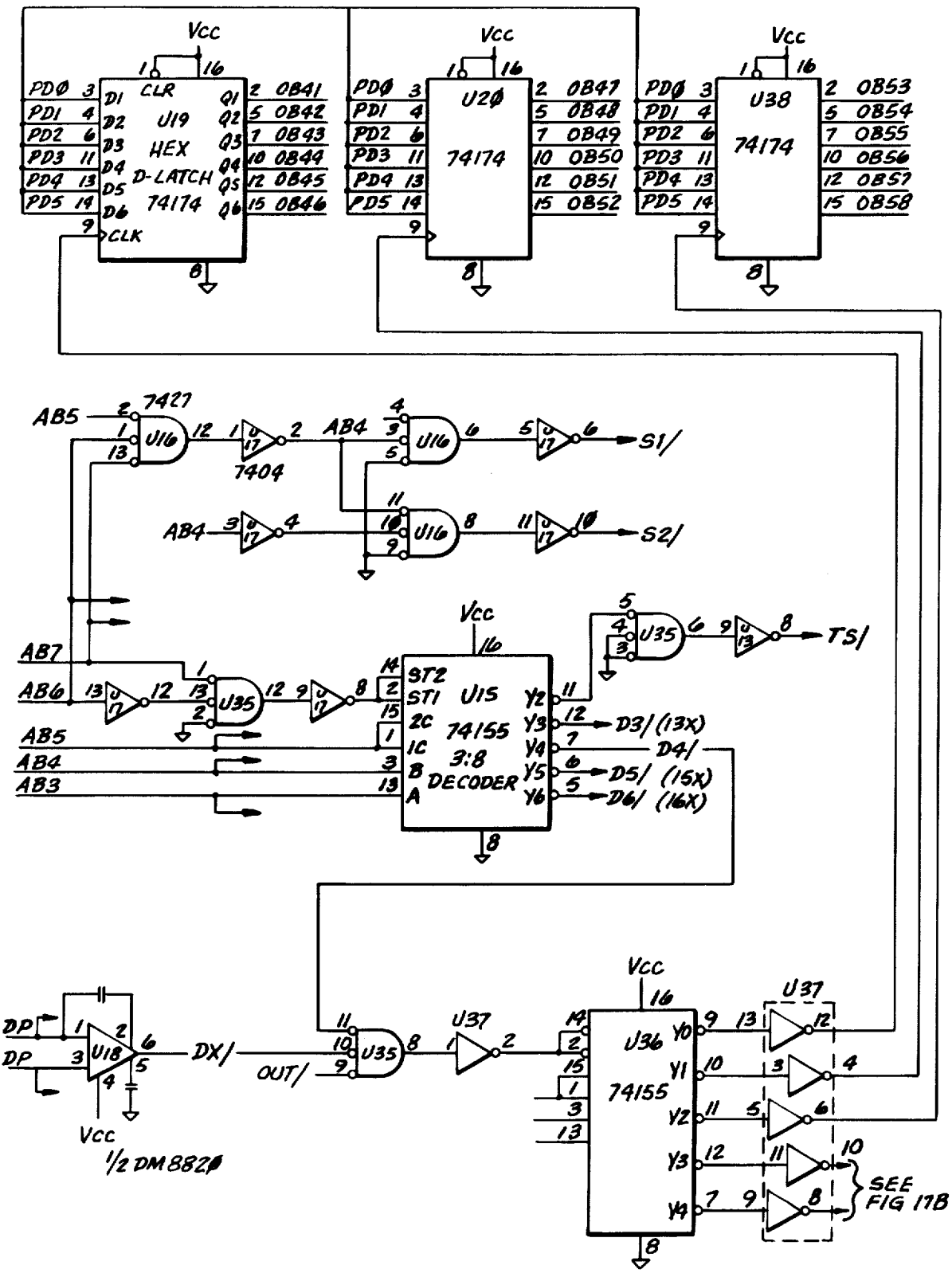
Figure 17B:
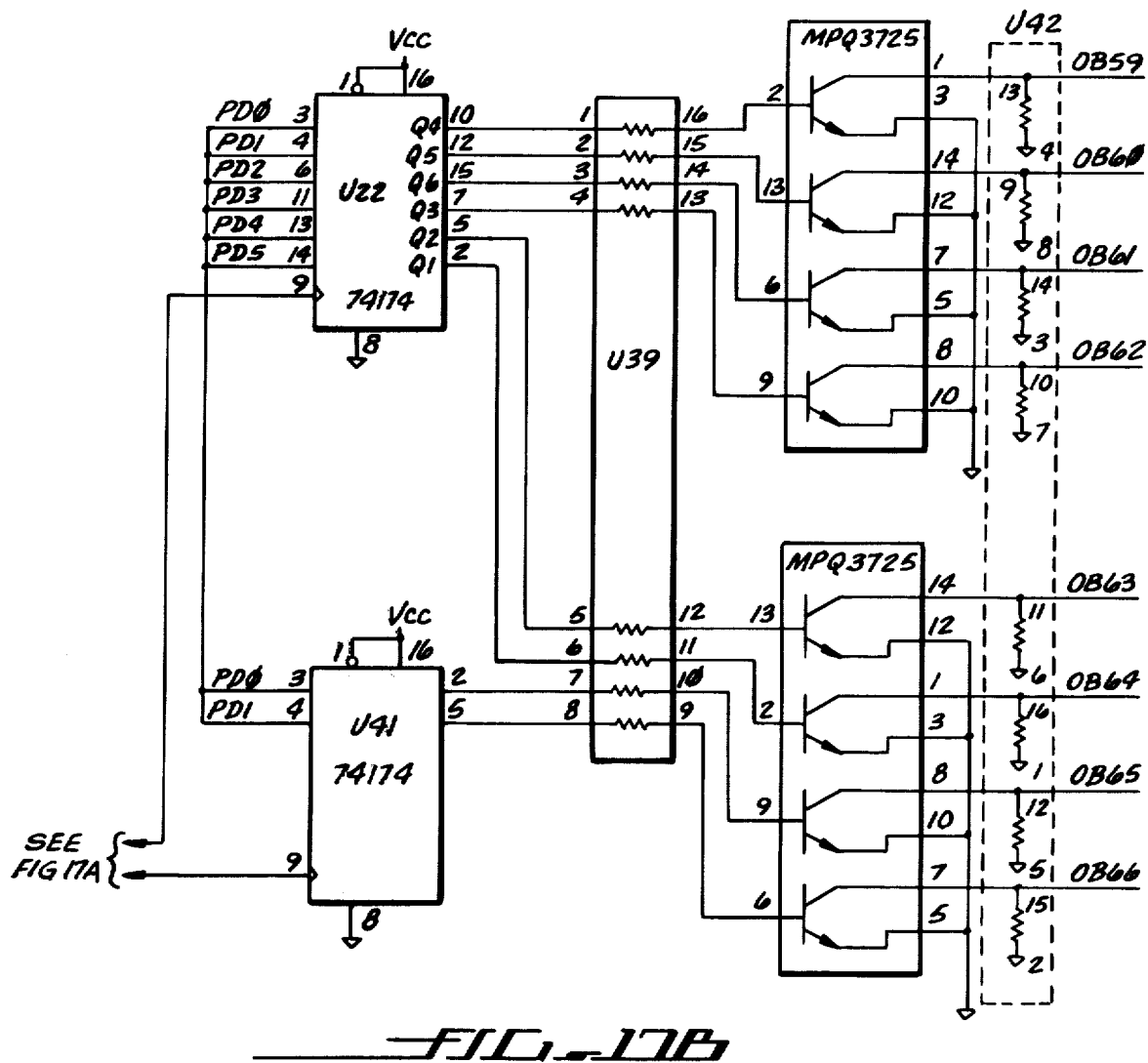

The switch logic board in FIGS. 17A, 17B and 18 are similar to the magnetics panel board. In FIG. 17 any one of three latches U19, U20, or U38 may be selected by addressing lines AB0 through AB7 and will transmit data received from lines PD0 through PD5 onto any one of 64 output lines, OB41 through OB66 in FIG. 17B are shown, which in turn drive lights and LED's on the control display panel. Output lines OB59 through OB66 are routed through an additional amplifier circuit MPQ3725 in order to enable those lines to drive high power devices such as incandescent lamps.

FIG. 18 is a schematic of one of eight 16-to-1 multiplexers used to multiplex S bits from the control display panel onto the bi-directional data lines PD0 through PD7. Only the PD0 circuit is shown. The inputs are brought in through input lines IB01 through IB16 but in addition, in the U6 circuit only, these input lines are also returned through a resistor to VCC. The customer may ground any of these lines and use it as an additional customer defined input bit from the control display panel. A total of 160 discrete input signals, labeled S bits in this system, are multiplexed through this circuit onto the eight PD lines.

The switch logic board shown in FIGS. 17A, 17B and 18 is located in the display panel and collects inputs from the operator area and outputs signals to the displays. While all of the signals are under control of the input/output controller, 24 L bits are provided to the panel for the user to determine which functions he needs to have displayed. Therefore, on FIGS. 17A and B lines OB41 through OB66 are for the customer's specific use. The circuit of FIG. 18 collects 160 discrete input signals which eventually become S bits in the ladder diagram. The remaining L and S bit schematics have been deleted because of redundant material.

The hardware may conveniently be summarized through the use of the block diagram on FIG. 19. The main bus of the system is the bi-directional ML data bus containing lines ML0 through ML15. It is the primary connection between the input/output controller control memory, the 3 chip microcomputer comprising the control unit and two ALU's and the buffering circuits which transmit address and data information to and from the common data memory. The X bus transmits data between the two chip arithmetic logic unit and the input/output controller logic board which in turn transmits and receives data through the switch logic panel to the control display panel and through the magnetics panel to the machine tool. Ultimately, the outputs of the operator panel are displayed to the operator by a series of lights and numerical displays and inputs from the operator are received through switch settings. The magnetics panel delivers high power and high voltage function-driving signals to the machine tool and receives switching information from the machine tool. As stated, the common data memory communicates with the input/output controller control memory through a data bus and an address bus. The same address and data buses also communicate with the other microcomputers in the system. It is through these data buses and address buses that the three controllers may address the common memory, allowing the system to operate with three separate microcomputers.

When a signal is sent from the arithmetic logic units to any one of the operator panel or machine tool functions, the address is transmitted first through the ML bus and then the data is transmitted through the X bus, forming a two-phase mode of operation. Control lines are supplied to inform the input/output logic board to first prepare by setting up the input/output address buffer and then receive or transmit data.

The maintenance, modification and troubleshooting of typical computer numerical control systems sometimes presents problems in that it is difficult, even with complete documentation, to understand, debug and modify another's program. This is in contrast to a typical relay controlled machine in that the relays themselves are easy to understand and may be intentionally held open or closed to facilitate troubleshooting. To solve this problem an additional hardware device has been added to the system. It is implemented from integrated circuit logic and appears to the system as an additional microcomputer. However, the device itself, including a hand-held unit in the preferred embodiment, presents to the operator a light and a series of switches allowing the operator to see the status of each relay contact position of each simulated relay in the ladder diagram which position is represented by a 0 if the contact is simulated open and a 1 if the contact is simulated closed and to switch each relay contact position so simulated into a 0 or 1 state, i.e., open or closed if he desires. Thus, this hand-held system analyzer combines the power of a computerized numerical control system with the apparent simplicity of a relay system in terms of debugging and maintaining the ladder interface. In operation the operator simply dials a simulated relay letter and number and a light will indicate the status of the simulated relay contact position. Other switches on the analyzer allow the operator to set the bit representing the particular simulated relay contact position to either a 0 or a 1 simulating either an open or closed contact for as long as the switch is held.

FIGS. 20A, 20B, and 21 are schematics of this system analyzer. The cable 122 of FIG. 20B connects the circuits located inside the system with a hand-held unit which contains everything to the left of the cable in the schematic. The circuit board of this analyzer plugs into a micrcomputer slot in the main card cage and simulates another computer to the rest of the system.

On the hand-held unit are four binary coded switches which can be used to dial up one letter and three bcd numbers. Thus, for example, I102 may be dialed. The lamp will show the status of this bit and if either SW1 or SW2 is depressed the status of this bit will be locked into a 0 or 1 status, respectively. The remainder of the circuits on FIGS. 20A and 20B are circuits which translate the bcd switch positions into binary data understandable by the system, the result being the appropriate coding of the outputs on lines MADR00 through MADR15 specifying the address corresponding to the "relay" bit dialed up on the hand-held unit.

In addition to the hand-held system analyzer, a particular thumb wheel switch on the front panel and one LED may be used to check on the status of any bit in one bit memory. A particular thumb wheel switch and the set of LED's and switches associated with it are normally reserved for the entering of system constants into the common data memory. However, when this set of LED's and switches are not used for that purpose they are available for some other purpose and may be used to define a letter and a 3-digit number to specify one of the system bits. An LED is used to display the status of the particular chosen bit. The software for this function is contained within the regular control memory program storage area. Once each input/output controller scan cycle, the input/output controller interrogates the switch positions, accesses the appropriate bit and sends it out on the specified L bit output line for display to the operator.

The data flow of the input/output controller is summarized in FIG. 22. At the top is the RAM chip containing 1K by one bit of relay status information. The first 160 locations are S bits received from the control panel through the magnetics logic board and through the input/output controller which is shown in the center of this figure. The information from the controller panel must be debounced before it is stored.

The I bits are received from the machine tool through the magnetics board and also must be debounced before loading into one bit RAM. The Q bits represent the status of various digital circuits in the system, are received from other programs, and need not be debounced. At this point all the inputs have been supplied to the ladder solver software and it begins to generate outputs in the form of C, F, L and O bits. The ladder itself, as well as the utility programs and ladder solving software, are all located in the input/output controller control memory. Finally, the L and O bits are output through the input/output controller to the panel lights on the operator display panel and to the magnetics board for output to the machine tool. The F bits are then available to the other programs in the system.

The 1K by bit RAM chip is located in common data memory and therefore is accessible to all other computers, including the hand-held analyzer which appears as another computer to the common data memory.

While an exemplary embodiment of this invention has been described above and shown in the accompanying drawings, it is to be understood that such embodiment is merely illustrative of, and not restrictive on, the board invention and that we do not wish to be limited in our invention to the specific construction or arrangement described and shown, for various obvious modifications may occur to persons having ordinary skill in the art.

We claim:

1. A numerical control system simulating the position of contacts of control relays for controlling a machine tool comprising:
    a tape reader for reading numerical data stored on tape, said data describing the shape of a machined part and the control functions required of said machine tool to produce said part,
    a interpolator for receiving said data describing the shape of said machined part, and for translating said data into discrete tool and part repositioning instructions in real time,
    an axis controller coupled to said interpolator for converting said instructions into speed commands,
    servo circuits, one for each machine tool axis, coupled to said axis controller for rotating said axis in accordance with said speed commands, and
    an input/output controller for coupling said tape data describing the shape of said machine part to said interpolator and for controlling the control functions of said machine in accordance with the data received from said tape, and
    means for causing said controller to simulate relay contact positions of said relays required to control said machine tool controllable by the operator during the operation of the machine tool.

2. The apparatus of claim 1 further comprising:
    a control display panel coupled to said input/output controller for displaying to the machine tool operator the status of said simulated relay contact positions, the status of said numerical control system and for transmitting to said input/output controller the state of operator controls on said control display panel in the form of numerical data.

3. The apparatus of claim 2 wherein said control display panel further comprises:
    means for selecting a particular simulated relay contact position, and for displaying the state of said contact position so simulated to the operator, and
    wherein said input/output controller further comprises:
        means responsive to the means for selecting for outputting the status of said simulated relay contact positions to said means for displaying.

4. The apparatus of claim 3, wherein said means for displaying further comprises:
    means for specifying the state of said selected simulated relay contact position, and
    wherein said input/output controller further comprises:
        means to set the state of said selected simulated relay contact position to the state specified by said means for displaying.

5. The apparatus of claim 2 further comprising:
    hand-held means connected by cable to said numerical control system for selecting a particular simulated relay and for displaying the simulated position of said relay contacts to the operator, and
    wherein said numerical control system is responsive to said hand-held means for outputting the simulated position of said relay contacts of said selected simulated relay to said hand-held means.

6. The apparatus of claim 5 wherein said hand-held means further comprises:
    means for specifying the simulated position of said contacts of said selected simulated relay, and
    wherein said input/output controller further comprises:
        means to set the state of said selected simulated relay to the state specified by said means for displaying.

7. A numerical control system for controlling a machine tool comprising:
    a. a numerically controlled machine tool adapted for controlled movement responsive to numerical data;
    b. a source of numerical data;
    c. a first microprocessor for receiving said data, having independent memory accessible only by said first microprocessor for translating said data into discrete tool and part repositioning instructions;
    d. a second microprocessor for receiving said instructions, having independent memory accessible only by said second microprocessor for converting said instructions into speed commands;
    e. at least one servo for at least one machine tool axis responsive to said speed commands for movement of said axis in accordance with said speed command;
    f. a third microprocessor, for coupling data between said machine tool, said first microprocessor, said second microprocessor and said servo, having independent memory accessible only by said third microprocessor;
    g. means for causing said third microprocessor to simulate the contact positions of relays required to control said machine tool;
    h. central memory accessible by each microprocessor on a time share basis for storing data for subsequent retrieval.

8. A numerical control system for controlling a machine tool as described in claim 7, wherein said simulating means is controllable by the operator during the operation of the machine tool.

* * * * *

UNITED STATES PATENT OFFICE
CERTIFICATE OF CORRECTION

PATENT NO. : 4,149,235
DATED : 10 April 1979
INVENTOR(S) : Stanley G. Froyd, et al It is certified that error appears in the above-identified patent and that said Letters Patent are hereby corrected as shown below:

In column 4, line 7, the number [119] should be 118; column 5, line 23, the word [specifically,,] should be specifically,; column 7, line 58, in the equation $[(I_r(Q_t)]$ should be $(I_t(Q_t)$.

Signed and Sealed this

Twenty-fourth Day of July 1979

[SEAL]

Attest:

Attesting Officer

LUTRELLE F. PARKER
*Acting Commissioner of Patents and Trademarks*